(12) United States Patent
Nian et al.

(10) Patent No.: US 11,407,644 B2
(45) Date of Patent: Aug. 9, 2022

(54) GRAPHENE WITH NANOSIZED OPENINGS

(71) Applicants: Qiong Nian, Scottsdale, AZ (US); Dini Wang, Tempe, AZ (US)

(72) Inventors: Qiong Nian, Scottsdale, AZ (US); Dini Wang, Tempe, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 315 days.

(21) Appl. No.: 16/722,313

(22) Filed: Dec. 20, 2019

(65) Prior Publication Data
US 2020/0198974 A1    Jun. 25, 2020

Related U.S. Application Data

(60) Provisional application No. 62/783,845, filed on Dec. 21, 2018.

(51) Int. Cl.
*C01B 32/192* (2017.01)
*C01B 32/198* (2017.01)

(52) U.S. Cl.
CPC .......... *C01B 32/192* (2017.08); *C01B 32/198* (2017.08); *C01P 2004/17* (2013.01)

(58) Field of Classification Search
CPC ... C01B 32/192; C01B 32/198; C01B 32/182; C01B 2204/00; C01B 2204/02; C01B 2204/04; C01B 2204/06; C01B 2204/065; C01B 2204/20; C01B 2204/22; C01B 2204/24; C01B 2204/26; C01B 2204/28; C01B 2204/30; C01B 2204/32; C01B 32/20; C01B 32/205; C01B 32/21; C01B 32/215; C01B 32/22; C01B 32/225; C01B 32/23; C01P 2004/17
See application file for complete search history.

(56) References Cited

U.S. PATENT DOCUMENTS

2018/0142114 A1* 5/2018 Duan ................. H01M 4/0404

FOREIGN PATENT DOCUMENTS

WO    WO 2018/044762    *  3/2018 ............. C01B 31/04
WO    WO 2018044762 A1    3/2018

OTHER PUBLICATIONS

Alsharaeh, et al., Novel synthesis of holey reduced graphene oxied (HRGO) by microwave irradiation method for anode in lithium-ion batteries, Scientific Reports 2016; 6: 29854: pp. 2-13 (Year: 2016).*

(Continued)

*Primary Examiner* — Daniel C. McCracken
(74) *Attorney, Agent, or Firm* — Fish & Richardson P.C.

(57) ABSTRACT

Synthesizing holey graphene oxide includes dispersing graphene oxide in an aqueous solution to yield a first graphene oxide dispersion, irradiating the first graphene oxide dispersion with microwave radiation, thereby at least partially reducing the graphene oxide in the first graphene oxide dispersion to yield a second graphene oxide dispersion that includes partially reduced graphene oxide, combining the second graphene oxide dispersion with an etching agent to form a third graphene oxide dispersion, and irradiating the third graphene oxide dispersion with microwave radiation to yield a fourth graphene oxide dispersion comprising holey graphene oxide.

20 Claims, 12 Drawing Sheets

(56) References Cited

OTHER PUBLICATIONS

Patel et al., "Microwave Enabled One-Pot, One-Step Fabrication and Nitrogen Doping of Holey Graphene Oxide for Catalytic Applications," Small, 2015, 11(27):3358-3368.
Peng et al., "A facile approach to produce holey graphene and its application in supercapacitors," Carbon, Sep. 28, 2014, 81:347-356.
Perdew et al., "Generalized Gradient Approximation Made Simple," Physical Review Letters, Oct. 28, 1996, 77(18):3865-3868.
Perrozzi et al., "Graphene oxide: from fundamentals to applications," Journal of Physics: Condensed Matter, Nov. 24, 2014, 27(013002): 21 pages.
Perrozzi et al., "Use of Optical Contrast to Estimate the Degree of Reduction of Graphene Oxide," The Journal of Physical Chemistry C, Dec. 3, 2012, 117(1):620-625.
Pumera, "Graphene-based nanomaterials and their electrochemistry," Chemical Society Review, Jul. 9, 2010, 39(11):4146-4157.
Qie et al., "Highly Rechargeable Lithium-CO2 Batteries with a Boron- and Nitrogen-Codoped Holey-Graphene Cathode," Angewandte Chemie International Edition, 2017, 56(24):6970-6974.
Raccichini et al., "The role of graphene for electrochemical energy storage," Nature Materials, Dec. 22, 2014, 14(3):271-279.
Radich et al., "Making Graphene Holey. Gold-Nanoparticle-Mediated Hydroxyl Radical Attack on Reduced Graphene Oxide," ACS Nano, May 5, 2013, 7(6):5546-5557.
Randles, "Kinetics of rapid electrode reactions," Discussions of the Faraday Society, Jan. 1, 1947, 1:11-19.
Savaram et al., "Dry microwave heating enables scalable fabrication of pristine holey graphene nanoplatelets and their catalysis in reductive hydrogen atom transfer reactions," Carbon, Jul. 25, 2018, 139: 861-871.
Shang et al., "Catalyst-Free Efficient Growth, Orientation and Biosensing Properties of Multilayer Graphene Nanoflake Films with Sharp Edge Planes," Advanced Functional Materials, 2008, 18(21):3506-3514.
Stankovich et al., "Synthesis of graphene-based nanosheets via chemical reduction of exfoliated graphite oxide," Carbon, Mar. 6, 2007, 45(7):1558-1565.
Stolyarova et al., "Effect of Hot Pressing on the Electrochemical Performance of Multilayer Holey Graphene Materials in Li-ion Batteries," Physica Status Solidi Biomolecules, Oct. 2018, 255(1800202): 7 pages.
Su et al., "Highly Efficient Restoration of Graphitic Structure in Graphene Oxide Using Alcohol Vapors," ACS Nano, Aug. 18, 2010, 4(9):5285-5292.
Sun et al., "Graphene based new energy materials," Energy & Environmental Science, Feb. 5, 2011, 4(4):1113-1132.
Sun et al., "Three-dimensional holey-graphene/niobia composite architectures for ultrahigh-rate energy storage," Science, May 12, 2017, 356(6338):599-604.
Tanaka et al., "Microwave heating of water, ice, and saline solution: Molecular dynamics study," The Journal of Chemical Physics, Jan. 18, 2007, 126(034509): 10 pages.
Voiry et al., "High-quality graphene via microwave reduction of solution-exfoliated graphene oxide," Science, Sep. 23, 2016, 353(6306):1413-1416.
Walsh et al., "Dry-Processed, Binder-Free Holey Graphene Electrodes for Supercapacitors with Ultrahigh Areal Loadings," ACS Applied Materials & Interfaces, 2016, 8(43):29478-29485.
Wang et al., "A core-sheath holey graphene/graphite composite fiber intercalated with MoS2 nanosheets for high-performance fiber supercapacitors," Electrochimica Acta, Mar. 15, 2019, 305:493-501.
Wang et al., "A Review on Graphene-Based Gas/Vapor Sensors with Unique Properties and Potential Applications," Nano-Micro Letters, Nov. 26, 2015, 8(2):95-119.
Wang et al., "Review on Recent Progress in Nitrogen-Doped Graphene: Synthesis, Characterization, and Its Potential Applications," ACS Catalysis, Mar. 16, 2012, 2(5):781-794.

Wang et al., "Solution-processable graphene nanomeshes with controlled pore structures," Scientific Reports, Jun. 17, 2013, 3(1996): 5 pages.
Wang et al., "Super-Elastic Graphene Ripples for Flexible Strain Sensors," ACS Nano, Mar. 31, 2011, 5(5):3645-3650.
Wang et al., "The electromagnetic property of chemically reduced graphene oxide and its application as microwave absorbing material," Applied Physics Letters, Feb. 18, 2011, 98(072906): 3 pages.
Wu et al., "Nitrogenated holey graphene C2N monolayer anodes for lithium- and sodium-ion batteries with high performance," Energy Storage Materials, Sep. 4, 2018, 16:574-580.
Xu et al., "Holey graphene frameworks for highly efficient capacitive energy storage," Nature Communications, Aug. 8, 2014, 5(4554): 8 pages.
Xu et al., "Solution Processable Holey Graphene Oxide and Its Derived Macrostructures for High-Performance Supercapacitors," Nano Letters 2015, Jun. 9, 2015, 15(7):4605-4610.
Yang et al., "Holey Graphene Nanosheets with Surface Functional Groups as High-Performance Supercapacitors in Ionic-Liquid Electrolyte," ChemSusChem, 2015, 8(10):1779-1786.
Yuan et al., "The edge- and basal-plane-specific electrochemistry of a single-layer graphene sheet," Scientific Reports, Jul. 30, 2013, 3(2248): 7 pages.
Zang et al., "Green synthesis of holey graphene sheets and their assembly into aerogel with improved ion transport property," Electrochimica Acta, Jun. 29, 2016, 212:171-178.
Zhai et al., "Nano-RuO2-Decorated Holey Graphene Composite Fibers for Micro-Supercapacitors with Ultrahigh Energy Density," Small, 2018, 14(1800582): 13 pages.
Zhang et al., "Construction of a highly sensitive non-enzymatic nitrite sensor using electrochemically reduced holey graphene," Analytica Chimica Acta, Aug. 27, 2018, 1043:28-34.
Zhao et al., "Flexible Holey Graphene Paper Electrodes with Enhanced Rate Applications," ACS Nano, Oct. 8, 2011, 5(11):8739-8749.
Zhao et al., "Functional graphene nanomesh foam," Energy & Environmental Science, Apr. 1, 2014, 7(6):1913-1918.
Zhao et al., "Partially Reduced Holey Graphene Oxide as High Performance Anode for Sodium-Ion Batteries," Advanced Energy Materials, 2019, 9(1803215): 7 pages.
Zheng et al., "Effects of functional groups on the mechanical and wrinkling properties of graphene sheets," Carbon, Jul. 30, 2010, 48(15):4315-4322.
Zhu et al., "Carbon-Based Supercapacitors Produced by Activation of Graphene," Science, Jun. 24, 2011, 332(6037):1537-1541.
Zhu et al., "Exfoliation of Graphite Oxide in Propylene Carbonate and Thermal Reduction of the Resulting Graphene Oxide Platelets," ACS Nano 2010, 4(2):1227-1233.
Zhu et al., "Microwave assisted exfoliation and reduction of graphite oxide for ultacapacitors," Carbon, Feb. 4, 2010, 48(7):2118-2122.
Zhu et al., "Ultrafast Li-ion migration in holey-graphene-based composites constructed by a generalized ex situ method towards high capacity energy storage," Journal of Materials Chemistry A, Feb. 1, 2019, 7(9):4788-4796.
Alsharaeh et al., "Novel synthesis of holey reduced graphene oxide (HRGO) by microwave irradiation method for anode in lithium-ion batteries," Scientific Reports, Jul. 26, 2016, 6(29854): 13 pages.
Bagri et al., "Structural evolution during the reduction of chemically derived graphene oxide," Nature Chemistry, Jun. 6, 2010, 2:581-587.
Bai et al., "Formation process of holey graphene and its assembled binder-free film electrode with high volumetric capacitance," Electrochimica Acta, Dec. 1, 2015, 187:543-551.
Banerjee et al., "Electrochemistry at the Edge of a Single Graphene Layer in a Nanopore," ACS Nano, Dec. 18, 2012, 7(1):834-843.
Bard et al., "Electrochemical methods: fundamentals and applications," 2nd ed., Harris et al. (ed)., 2001, Chapter 17, p. 718.
Blochl, "Projector augmented-wave method," Physical Review B, Dec. 15, 1994, 50(24):17953-17979.
Bonaccorso et al., "Graphene, related two-dimensional crystals, and hybrid systems for energy conversion and storage," Science, Jan. 2, 2015, 347(6217): 11 pages.

(56) References Cited

OTHER PUBLICATIONS

Cai et al., "Synthesis and Solid-State NMR Structural Characterization of 13C-Labeled Graphite Oxide," Sep. 26, 2008, 321(5897):1815-1817.
Canado et al., "Quantifying Defects in Graphene via Raman Spectroscopy at Different Excitation Energies," Nano Letters, Jun. 22, 2011, 11(8):3190-3196.
Chen et al., "Preparation of graphene by the rapid and mild thermal reduction of graphene oxide induced by microwaves," Carbon, Nov. 26, 2009, 48(4):1146-1152.
Cote et al., "Tunable assembly of graphene oxide surfactant sheets: wrinkles, overlaps and impacts on thin film properties," Soft Matter 2010, 6(24):6096-6101.
Deng et al., "Wrinkled, rippled and crumpled graphene: an overview of formation mechanism, electronic properties, and applications," Materials Today, 2016, 19(4):197-212.
Dresselhaus et al., "Perspectives on Carbon Nanotubes and Graphene Raman Spectroscopy," Nano Letters, Jan. 19, 2010, 10(3):751-758.
Dreyer et al., "The chemistry of graphene oxide," Chemical Society Reviews, Nov. 3, 2009, 39(1):228-240.
Elgrishi et al., "A Practical Beginner's Guide to Cyclic Voltammetry," Journal of Chemical Education, Nov. 3, 2017, 95(2):197-206.
Fan et al., "Modified MXene/Holey Graphene Films for Advanced Supercapacitor Electrodes with Superior Energy Storage," Advanced Science, 2018, 5(1800750): 11 pages.
Fan et al., "Ultrahigh volumetric performance of a free-standing compact N-doped holey graphene/PANI slice for supercapacitors," Journal Materials Chemistry A, Jul. 10, 2017, 5(32): 16689-16701.
Ferrari et al., "Interpretation of infrared and Raman spectra of amorphous carbon nitrides," Physical Review Biomolecules, 2003, 67(155306): 20 pages.
Ferrari et al., "Raman spectroscopy as a versatile tool for studying the properties of graphene," Nature Nanotechnology, Apr. 4, 2013, 8(4):235-246.
Ferrari et al., "Interpretation of Raman spectra of disordered and amorphous carbon," Physical Review Biomolecules, May 15, 2000, 61(20):14095-14107.
Han et al., "Compressible, Dense, Three-Dimensional Holey Graphene Monolithic Architecture," ACS Nano, Mar. 6, 2017, 11(3):3189-3197.
Han et al., "Scalable Holey Graphene Synthesis and Dense Electrode Fabrication toward High-Performance Ultracapacitors," ACS Nano 2014, 8(8):8255-8265.
Han et al.,"Steam Etched Porous Graphene Oxide Network for Chemical Sensing," Journal of the American Chemical Society, 2011, 133(39):15264-15267.
He et al., "Holey graphene/polypyrrole nanoparticle hybrid aerogels with three-dimensional hierarchical porous structure for high performance supercapacitor," Journal of Power Sources, Apr. 1, 2016, 317:10-18.
Higgins et al., "The application of graphene and its composites in oxygen reduction electrocatalysis: a perspective and Yeview of recent progress," Energy Environmental Science, Nov. 6, 2015, 9(2):357-390.
Hu et al., "The role of microwave absorption on formation of graphenefrom graphite oxide," Carbon, Dec. 8, 2011, 50(9):3267-3273.
Huang et al., "Temperature-dependent electrical property transition of graphene oxide paper," Nanotechnology, Oct. 19, 2012, 23(455705) 10 pages.
Jiang et al., "Preparation of high-quality graphene using triggered microwave reduction under an air atmosphere," Journal of Materials Chemistry C, Jan. 19, 2018, 6(7):1829-1835.

Jiang et al., "The role of holes in improving the performance of nitrogen-doped holey graphene as an active electrode material for supercapacitor and oxygen reduction reaction," Journal of Power Sources, Nov. 25, 2013, 251:55-65.
Jiao et al., "Boosting long-cycle-life energy storage with holey graphene supported TiNb2O7 network nanostructure for Tithium ion hybrid supercapacitors," Journal of Power Sources, Sep. 28, 2018, 403:66-75.
Jokar et al., "An efficient two-step approach for improvement of graphene aerogel characteristics in preparation of supercapacitor electrodes," Journal of Energy Storage, Apr. 30, 2018, 17:465-473.
"Kang et al., ""Efficient heat generation in large-area graphene films by electromagnetic wave absorption,"" 2D Materials, Feb. 17, 2017, 4(025037): 6 pages".
Kirsch et al., "Scalable Dry Processing of Binder-Free Lithium-Ion Battery Electrodes Enabled by Holey Graphene," ACS Applied Energy Materials, Apr. 15, 2019, 2(5):2990-2997.
Kong et al., "Holey graphene hydrogel with in-plane pores for high-performance capacitive desalination," Nano Researh, 2016, 9 (8):2458-2466.
Kotal et al., "Sulfur and nitrogen co-doped holey graphene aerogel for structurally resilient solid-state supercapacitors under high compressions," Journal of Materials Chemistry A, Jul. 15, 2017, 5(33):17253-17266.
Kresse et al., "Efficiency of ab-initio total energy calculations for metals and semiconductors using a plane-wave basis set," Computational Materials Science, 1996, 6(1):15-50.
Kresse et al., "From ultrasoft pseudopotentials to the projector augmented-wave method," Physical Review Biomolecules, Jan. 15, 1999, 59(3):1758-1775.
Kudin et al., "Raman Spectra of Graphite Oxide and Functionalized Graphene Sheets," Nano Letters, Dec. 22, 2007, 8(1):36-41.
Kumatani et al., "Chemical Dopants on Edge of Holey Graphene Accelerate Electrochemical Hydrogen Evolution Reaction," Advanced Science, 2019, 6(1900119): 8 pages.
Lacey et al., "Highly compressible, binderless and ultrathick holey graphene-based electrode architectures," Nano Energy, Nov. 29, 2016, 31:386-392.
Li et al., "Graphene oxide: A promising nanomaterial for energy and environmental applications," Nano Energy, Jul. 26, 2015, 16:488-515.
Lin et al., "Bulk preparation of holey graphene via controlled catalytic oxidation," Nanoscale, Jun. 4, 2013, 5(17):7814-7824.
Lin et al., "Synthesis challenges for graphene industry," Nature Materials, Jun. 2019, 18(6):520-524.
Lin et al., "Ultrahigh-Capacity Lithium-Oxygen Batteries Enabled by Dry-Pressed Holey Graphene Air Cathodes,." Nano Letters, Mar. 31, 2017, 17(5):3252-3260.
Liu et al., "Mild synthesis of holey N-doped reduced graphene oxide and its double-edged effects in polyaniline hybrids for supercapacitor application," Electrochimica Acta, Mar. 12, 2019, 305:175-186.
Lv et al., "Controllable Preparation of Holey Graphene and Electrocatalytic Performance for Oxygen Reduction Reaction," Electrochimica Acta, Jan. 6, 2017, 228:203-213.
Marcano et al., "Improved Synthesis of Graphene Oxide," ACS Nano 2010, Jul. 22, 2010, 4(8):4806-4814.
Novoselov et al., "2D materials and van der Waals heterostructures," Applied Physics, Jul. 29, 2016, 353(6298): 13 pages.
Novoselov et al., "A roadmap for graphene," Nature, Oct. 11, 2012, 490(7419):192-200.
Pan et al., "Wrinkle Engineering: A New Approach to Massive Graphene Nanoribbon Arrays," Journal of the American Chemical Society, Oct. 7, 2011, 133(44):17578-17581.

* cited by examiner

GRAPHENE WITH NANOSIZED OPENINGS

CROSS-REFERENCE TO RELATED APPLICATION

This application claims the benefit of U.S. Provisional Application No. 62/783,845 entitled "GRAPHENE WITH NANOSIZED OPENINGS" and filed on Dec. 21, 2018, which is incorporated by reference herein in its entirety.

TECHNICAL FIELD

This invention relates to methods of fabricating graphene oxide with nanosized openings ("holey graphene").

BACKGROUND

The single-atom thickness of graphene makes it very versatile to use in various applications, especially with the increasing demand of nanotechnology. Using graphene along with other nanomaterials enables the possibility of manufacturing nanoscale devices with both high performance and high functional complexity. However, a major challenge is that the mass transport in the graphene-based structures is significantly blocked by the basal-planes of graphene sheets.

Holey graphene provides abundant nanoholes on its basal plane that act as mass transport channels by allowing ions or molecules to pass through the basal-plane of the graphene sheet. As a result, holey graphene can largely enhance the diffusion kinetics of the graphene-based nanostructures. Currently, the most prevalent method of holey graphene synthesis is the chemical etching approach, in which graphene oxide (GO) solutions are heated with a strong acid etching agent. However, these methods generally require hours to obtain products, and are not safe or eco-friendly ("green"). It remains a challenge to efficiently synthesize holey graphene.

SUMMARY

As described herein, holey graphene oxide (or "holey graphene") can be synthesized using microwaves to assist the chemical etching of graphene oxide (GO) sheets by an etching agent. This method provides fast and controllable synthesis of holey graphene with tunable structural features and electrochemical properties. In addition, this method of synthesis provides a scalable and fast manufacturing route for holey graphene with improved electrochemical performance compared to graphene. The upgrades in the mass transport and electrochemical activity provided by this method of holey graphene synthesis can also enlarge the application range of graphene.

In a general aspect, synthesizing holey graphene oxide includes dispersing graphene oxide in an aqueous solution to yield a first graphene oxide dispersion, irradiating the first graphene oxide dispersion with microwave radiation, thereby at least partially reducing the graphene oxide in the first graphene oxide dispersion to yield a second graphene oxide dispersion comprising at least partially reduced graphene oxide, combining the second graphene oxide dispersion with an etching agent to form a third graphene oxide dispersion, and irradiating the third graphene oxide dispersion with microwave radiation to yield a fourth graphene oxide dispersion comprising holey graphene oxide.

Implementations of the general aspect may include one or more of the following features.

The graphene oxide includes graphene oxide nanosheets. A power of the microwave radiation is in a range between 50 W and 400 W.

Some implementations include stirring the first graphene oxide dispersion while irradiating the first graphene oxide dispersion. Certain implementations include irradiating the first graphene oxide dispersion for a length of time between 90 seconds and 360 seconds. Irradiating the first graphene oxide dispersion results in the formation of vacancy defects on the graphene oxide by electromagnetic wave-induced heating. Irradiating the first graphene oxide dispersion can result in nonlinear heating of the first graphene oxide dispersion. Partially reducing the graphene oxide includes removing functional groups from the graphene oxide. Some implementations include irradiating the first graphene oxide dispersion for a length of time between 45 seconds and 180 seconds. Certain implementations include stirring the third graphene oxide dispersion while irradiating the third graphene oxide dispersion.

The etching agent typically includes one or more of hydrogen peroxide, $HNO_3$, KOH, Co, and $O_2$. Irradiating the third graphene oxide dispersion may occur in a sealed vessel. The fourth graphene oxide dispersion may include a plurality of holey graphene oxide nanosheets.

Each holey graphene oxide nanosheet defines a plurality of openings through a plane of the holey graphene oxide nanosheet (e.g., the basal plane). Each opening in the plurality of openings has a diameter in a range of 1 nm to 100 nm. Openings of the plurality of openings are uniformly distributed on each holey graphene nanosheet.

Synthesizing the holey graphene oxide occurs in less than one hour. The holey graphene oxide may be reduced to yield reduced holey graphene oxide. The C/O ratio of the holey graphene oxide is equal to or greater than the C/O ratio of the graphene oxide in the first graphene oxide dispersion.

The details of one or more embodiments of the subject matter of this disclosure are set forth in the accompanying drawings and the description. Other features, aspects, and advantages of the subject matter will become apparent from the description, the drawings, and the claims.

BRIEF DESCRIPTION OF THE DRAWINGS

FIGS. 13A and 13B show temperature and pressure profiles of deionized water and the dGO solutions of 1 and 3 mg mL$^{-1}$, respectively, processed under the same microwave irradiation. The inset in FIG. 13A shows the slope of temperature vs. time. FIG. 13C shows schematics of conventional heating (left) and microwave heating (right) of the GO aqueous solution with the addition of hydrogen peroxide.

DETAILED DESCRIPTION

Figure 1:
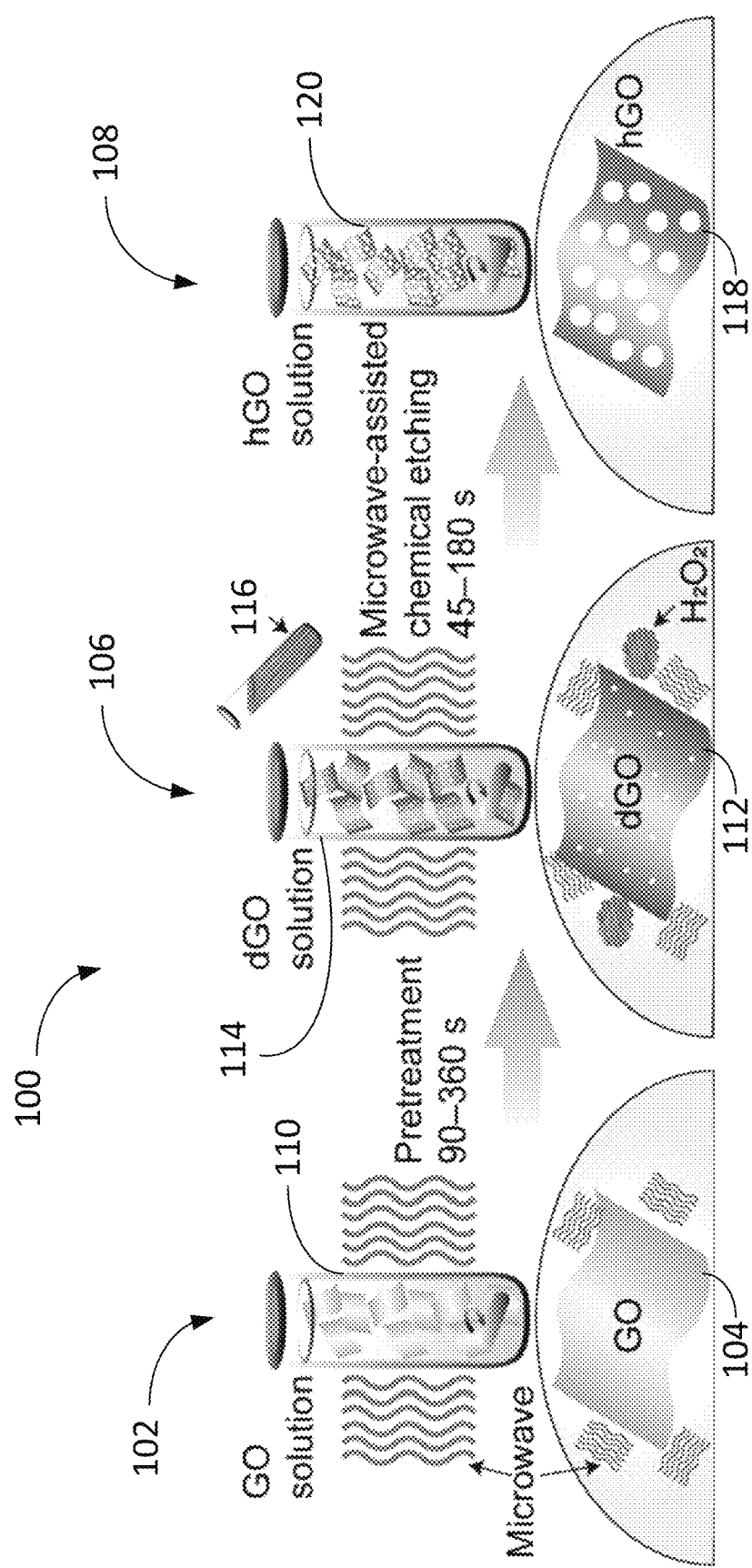
FIG. 1 depicts an exemplary process for synthesizing graphene with nanosized openings.

FIG. 1 depicts microwave assisted chemical etching (MACE) synthesis of holey graphene. This method provides fast and controllable synthesis of holey graphene with tunable structural features and electrochemical properties. As used herein, "holey graphene" generally refers to graphene sheets containing one or more openings through the basal plane of the sheets, the openings having a diameter in a range of 1-100 nm.

The MACE process includes vigorous chemical attack with rapid electromagnetic wave irradiation to reduce the processing time from hours to minutes. A strategy to effectively control the population and area percentage of nanoholes in the holey graphene is described, as well as the microstructural evolutions during each step of fabrication, including changes in atomic ratio, defect density, and number of functional groups. The versatile potential of this material with tunable electrochemical properties is demonstrated by adjusting the microstructure of nanoholes.

As shown in FIG. 1, MACE process 100 includes energy transfer 102 from microwave to graphene oxide (GO) sheets 104, oxidation 106 of GO sheets 104 by an etching agent, and the etching 108 of GO sheets (or "GO"). Microwave processing can be performed in a laboratory microwave oven, and the GO solution 110 is heated (e.g., in a sealed test-tube) by microwave radiation. The microwave radiation may be continuous. In some cases, a magnetic stirrer is used during heating to form a reasonable vortex to ensure a homogeneous distribution of the microwave field throughout the test-tube.

In some examples, the GO 104 is subjected to a pretreatment process prior to MACE synthesis. In the pretreatment process, a GO solution 110 is heated by microwave irradiation (e.g., 90-360 seconds) without any other chemical additions (e.g., without etchant). This pretreatment process at least partially removes the functional groups on the GO sheets in the GO solution, resulting in partial reduction of the GO prior to etching. Pretreatment of the GO solution, which results in a defected GO (dGO) 112 in dGO solution 114, also creates randomly distributed defects on the GO sheets. Removal of the functional groups by the pretreatment process allows a large numbers of defects (e.g., single- and few-atom vacancy defects) to form on the GO sheets where the functional groups are removed. Carbon monoxide, carbon dioxide, or both can be released during the pretreatment process.

The dGO solution 114 is combined with an etching agent 116 and can be mixed (e.g., using a stir bar). Examples of suitable etching agents include $H_2O_2$, $HNO_3$, KOH, Co, and $O_2$. The combined solution may then be heated by microwave irradiation (e.g., for 45-180 seconds). The heat on the GO sheets generated by the microwave provides a favorable condition for the reaction between GO and the etching agent. For example, $H_2O_2$ molecules can act as the oxidizer in the reaction, and attack the vulnerable regions on the GO sheets (e.g., the carbon atoms around vacancy defects, which are more chemically active) to form oxygen-related functional groups, such as hydroxyl, carbonyl, and epoxy groups. The formation of nanoholes on the GO sheets takes place in the oxidized regions, especially the defected and oxidized regions, due to the vibration of the atoms on GO sheets during microwave heating, accompanied with the loss of oxygen-related groups on the GO sheets. The MACE enlarges defects on the GO sheets to form nanoholes on the GO sheets. The high process efficiency, which results in the formation of holey graphene oxide (hGO) 118 in hGO solution 120 is due at least in part to the selective heating by microwave radiation on the GO-etchant interface.

The attack from the etching agent in the combined solution recovers the oxygen-related groups. Cyclic etching and oxidation during the MACE process causes cyclic insertion and removal of functional groups. As a result, nanoholes keep growing during cycling, and the cyclic oxidation and etching process can continuously increase the size and number of the nanoholes.

In some examples, the holey graphene is subjected to a reduction process following fabrication to generate reduced holey graphene. In the reduction process, the holey graphene is centrifuged and redispersed in de-ionized water. The redispersed holey graphene is then subjected to microwave irradiation. The heat in the reduction process results in removal of a signification portion of functional groups on the hGO. Removal of the functional groups allows for increased recovery of many of the properties of graphene, such as electrical conductivity and thermal conductivity.

Unlike most solution-based methods of holey graphene fabrication, process 100 can be used to control the formation and growth of nanoholes by tuning the processing durations of the pretreatment and MACE. It enables microstructural engineering of holey graphene to meet requirements of various applications.

The fabrication of holey graphene with excellent capacitive performance and electrochemical catalytic activity can be achieved within a few minutes via the MACE method, which is faster than conventional hour-scale approaches. Moreover, the population, average diameter, area percentage of nanoholes on holey graphene sheets can be effectively controlled by a strategy combining pretreatment and MACE to further promote the electrochemical properties. This microwave-assisted method is fast, controllable, solution-based, and thus favorable to be employed in large-scale manufacturing for various applications.

The structural characterizations provide insights into the nucleation and growth of nanoholes during each step of fabrication. The pretreatment causes a partial reduction of GO sheets with an increased defect density. DFT and MD simulations confirm that the vacancy defects can grow into nanoholes in a MACE process due to the coupling effect of microwave irradiation and etchant oxidation. During the MACE, the microwave-induced selective heating of GO sheets by both localized Joule heating and dielectric heating facilitates the effective etching of GO sheets and limits the decomposition of hydrogen peroxide during processing. In electrochemical measurements, the nanoholes on holey graphene improve the accessible surface area of the electrode, heterogeneous electron transfer, and ion diffusion kinetics, demonstrating the application potential of the microwave-fabricated holey graphene in the fields of energy storage and electrochemical catalysis.

EXAMPLES

Example 1

GO aqueous solutions fabricated by the improved Hummer's method were used to synthesize holey graphene. The improved Hummer's method of fabrication is further described in Marcano et al., *Improved Synthesis of Graphene Oxide, ACS Nano.* 4(8), 4806 (2010), which is incorporated by reference herein. Raw materials used to synthesize holey graphene by the described process include graphite flakes (50+ mesh powder) or graphene oxide nanosheets with a diameter of 0.1-50.0 μm, de-ionized water (18 MΩ/mL), potassium permanganate (powder), sulfuric acid (98%), hydrogen peroxide aqueous solution (30%), and chloride acid (1 M). A microwave source that provides an adjustable heating power at the range between 50-400 W and has an in-built magnetic stirring unit was used in the synthesis.

A pretreatment of a GO aqueous solution with the concentration of 1-5 mg/mL was performed prior to conducting the MACE process. The graphene oxide was dispersed in the de-ionized water by performing ultrasonication of the solution for 15 minutes. To perform pretreatment, a GO solution was filled into a sealable test-tube and then heated in a laboratory microwave oven (Anton Paar Monowave 400) at a constant power of 300 W for 90 seconds accompanied with vigorous magnetic stirring with a speed of 600 rpm. An infrared thermometer was used to record the temperature profile per second. A pressure sensor was used to record the pressure profile at the same time. A compressed air flow and a micro fan was used to cool the solution to room temperature.

The pretreated solution and a 30% hydrogen peroxide aqueous solution were added together into a test-tube with a volume ratio of 5:2. A magnetic stir bar is placed in the test tube. The test tube was sealed with a polytetrafluoroethylene (PTFE) cap prior to heating the solution, to allow for slight volume changes due to the variable pressure inside the tube during processing. The mixed solution was then heated in a laboratory microwave oven at a constant power of 50 W for 90 seconds. After microwaving was complete, the solution was allowed to cool.

Reduced holey graphene oxide nanosheets were obtained by a reduction process following the fabrication step. After cooling, the solution is centrifuged at 13,000-30,000 rpm for 30 minutes to remove $H_2O_2$ residue. The centrifugation precipitate was then re-dispersed in de-ionized water to form the holey graphene oxide (hGO) aqueous solution. To reduce the hGO, another microwave processing (e.g., with the same processing parameters as the pretreatment) was performed (e.g., with no other chemical additions). In one example, the solution was heated at the power of 200 W for 30 s in the microwave oven to yield an aqueous solution of holey graphene oxide (r-hGO). Large amounts of functional groups were removed from the graphene lattice, thereby restoring at least some aphysical properties, such as electrical conductivity.

Transmission electron microscopy (TEM) was used to characterize the microstructure and morphology of the graphene sheets at different stages or conditions of synthesis. To characterize the graphene sheets using TEM, samples in ethanol solution of 1~2 μg/mL were prepared. 1 μL of the prepared solution was dropped and then dried on a Cu grid covered with the lacey carbon film (Pacific-grids). TEM imaging was carried out on Titan using a 300-kV electron beam. A magnification of 215,000× was used for alignment. 8800× magnification was used to search the region of interest (ROI). High-resolution TEM (HRTEM) images were taken at magnifications above 100,000×.

The lateral sizes and thicknesses of the graphene sheets at different stages or conditions of synthesis were measured by atomic force microscopy (AFM). The same sample solutions prepared for TEM imaging were used for the sample preparation for AFM. A few droplets of 1 μL solution were dropped and dried on 300 nm $SiO_2$/Si substrate. AFM scanning was performed on a multimode scanning probe microscope (Bruker) using the contact mode. An AFM tip (Bruker) is 0.01-0.025 Ohm cm Antimony doped Si with 320 kHz resonance frequency and 42 N/m spring constant was used. A scanning rate of 96 Hz was used for ROI searching. A scanning rate of 256 Hz was used for data collection.

Raman spectroscopy was used to scan the Raman scattering features of the graphene sheets at different stages or conditions of synthesis. The same samples prepared for AFM scanning were used for Raman spectroscopy. Raman spectra scanning was taken with a laser of 532 nm wave length. The spectrum center is 2050 $cm^{-1}$ and the filter grating is 600 g/mm. Each Raman spectrum was collected in 10 single scans of 1 s.

All electrochemical measurements were carried out on an electrochemical workstation (CH Instrument 660E) with a three-electrode setup at ambient condition. The counter electrode was Pt wire, and the reference electrode was Ag/AgCl in saturated KCl (+1.97 V vs. standard hydrogen electrode, or −0.044 V vs. saturated calomel electrode). Two electrolytes were used in measurements: 5 mM potassium ferricyanide with 0.1 M KCl and 1 M $Na_2SO_4$. The electrochemical measurements processed in the first electrolyte reflect the charge transfer conductivity of the testing material, while the measurements using the second electrolyte indicate the ion transfer property of the testing material. For each measurement, the working electrode was prepared by dropping and drying 8 μg sample material on a freshly polished glassy carbon electrode (GCE). After each measurement, the GCE was carefully polished with alumina powder of 1.0, 0.3, 0.05 μm, respectively, and then thoroughly rinsed by de-ionized water, ethanol, acetone, and isopropanol, respectively. Cyclic voltammetry (CV) measurements scan from −0.2 V to 0.8 V at a scan rate of 50-500 mV/s. Specific mass capacitance ($C_s$) was calculated using the CV data and Equation (1):

$$C_s = \frac{\int i(E)dE}{2m\Delta VR} \quad (1)$$

where i(E) is the instant current at certain voltage, m is the mass of the active material, $\Delta V$ is the voltage range, and R is the scan rate. Before each CV scan, the internal-resistance drop was measured and compensated. Electrochemical impedance spectroscopy (EIS) measurements scan from 1 MHz to 1 Hz at a bias voltage of 5 mV.

Raman spectroscopy was used to characterize the change in defects and functional groups after the pretreatment of GO sheets. Comparing to the pristine GO, three differences in the Raman spectrum of the pretreated GO are noted as shown in Table 1, including a reduced ID/IG ratio, a broadened full width at the half maximum (FWHM) of G band, and a blue shift of G band (shifting to higher frequencies).

The FWHM of G band will increase with the disorder level, which is contributing by two factors, defects and functional groups, since both of factor affect the percentage of the $sp^2$ graphitic domain interacting with the Raman laser beam. The disorder level can be increased by adding more defects or functional groups and can be reduced by removing them. Given by the fact that the FWHM of G band of the GO sheets increases after pretreatment, there can be an increase in both defects and functional groups or just one of them. The blue shift of the G band in the Raman spectrum of the pretreated GO is also consistent with the broadened FWHM of G band, because the increasing of both defects and functional groups can result in the blue shift of G band.

TABLE 1

The values of the intensity ratio of D band to G band, full width at half maximum, and peak position of G band in the Raman spectra of GO, pretreated GO, hGO, and r-hGO.

| Sample | ID/IG (Amplitude) | FWHM (G band) | Position (G band) |
|---|---|---|---|
| GO | 1.25 | 84 cm$^{-1}$ | 1588 cm$^{-1}$ |
| Pretreated GO | 1.15 | 87 cm$^{-1}$ | 1592 cm$^{-1}$ |
| hGO | 1.10 | 75 cm$^{-1}$ | 1595 cm$^{-1}$ |
| r-hGO | 1.25 | 67 cm$^{-1}$ | 1598 cm$^{-1}$ |

Figure 3:
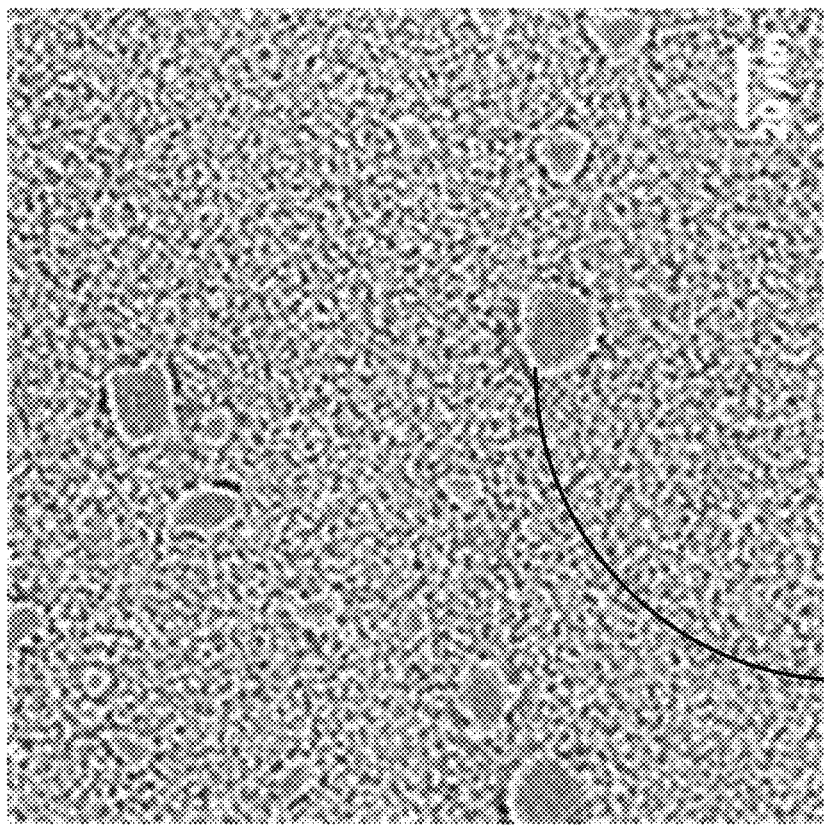
FIG. 3 shows a high-resolution TEM (HRTEM) image of holey graphene oxide.
Figure 2:
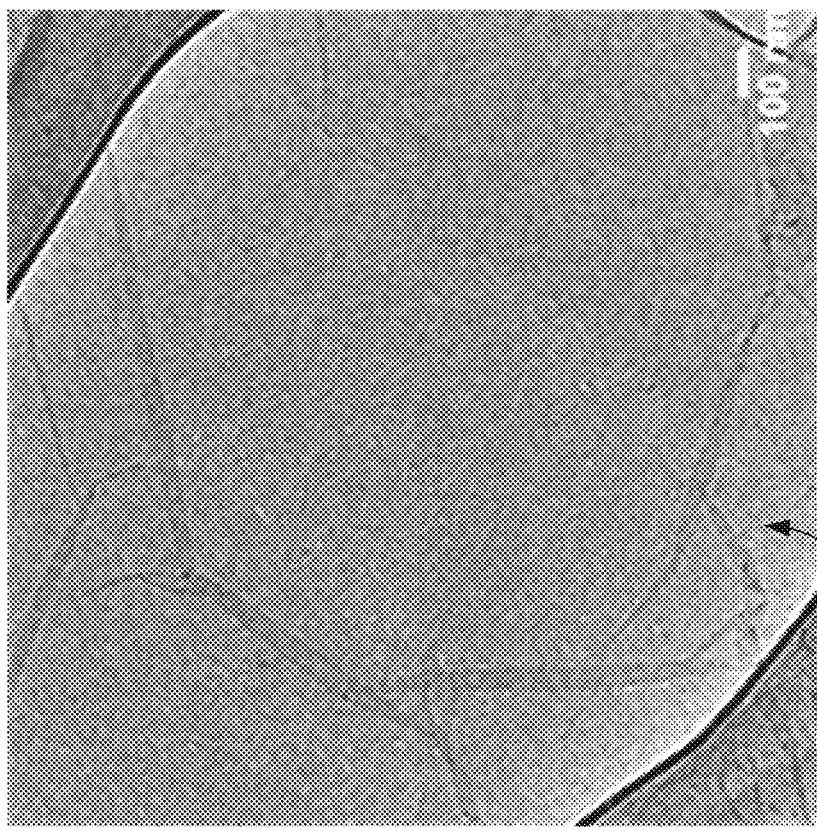
FIG. 2 shows a transmission electron microscope (TEM) image of holey graphene oxide.

After pretreatment, the obtained GO solution was subjected to the MACE process. As shown in FIGS. 2 and 3 (magnified portion of FIG. 2), after the MACE process, holes 300 with a diameter ranging from atomic scale to a few tens of nanometers are formed all over the hGO sheets.

According the cross-sectional measurements after the MACE process, the lateral size of GO was reduced, and the thickness remained the same. The lateral sizes of most of the pristine GO sheets were larger than 5 µm, while those of hGO are mostly less than 5 µm. The thicknesses of GO and hGO were both about 1.1 nm. As shown in Table 1, the Raman spectrum of hGO shows a lower ID/IG ratio, a narrowed FWHM of G band, and a blue shift compared with that of the pretreated GO.

The reduction process was provided to remove functional groups on hGO forming r-hGO. Removal of a portion of the functional groups allows for increased recovery of many of the properties of graphene, such as electrical conductivity and thermal conductivity. Heating the solution causes the removal of functional groups. As shown in Table 1, the Raman spectrum of r-hGO showed a higher ID/IG ratio, a narrowed FWHM of G band, and a blue shift of G band compared with that of hGO. Both the higher ID/IG ratio and the narrowed G band demonstrate successful removal of functional groups on hGO. The blue shift of G band may indicate an increased number of edge-site carbon atoms emerging as a result of removal of functional groups. The fracture of hGO sheets may have also occurred during the removal of functional groups since the nanoholes can reduce the strain resistance of GO and bring an increase in the stress-concentration level.

One advantage of the MACE is the ultrafast processing. The total processing time of the MACE is within a few minutes. It is believed that the ultrafast processing of the MACE is a result of efficient energy transfer. To probe the energy transfer mechanism during the MACE, experimental and computational studies were carried out.

Figure 4:
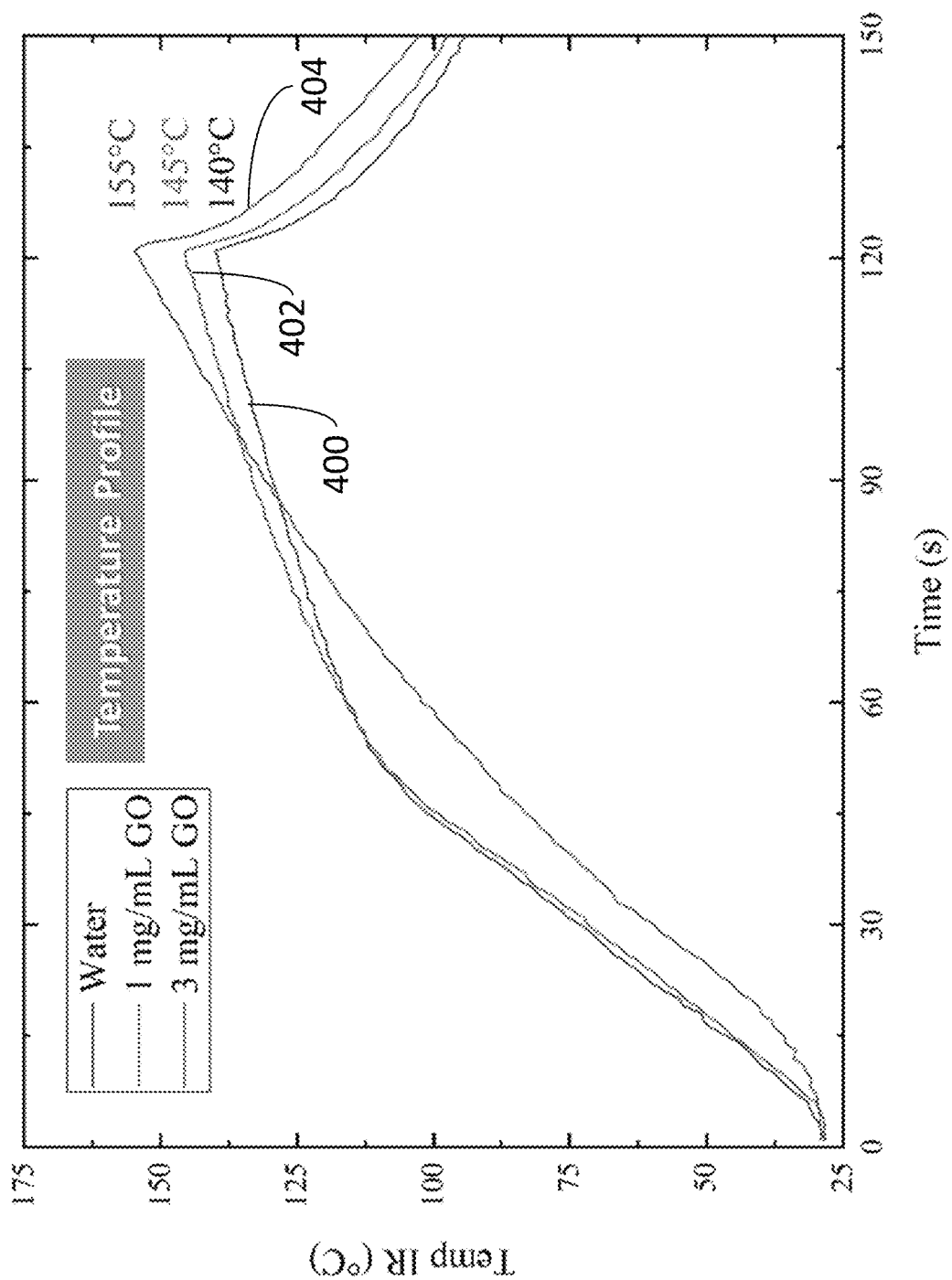
FIGS. 4 and 5 show temperature and pressure profiles, respectively, of graphene oxide solutions during heating.
Figure 5:
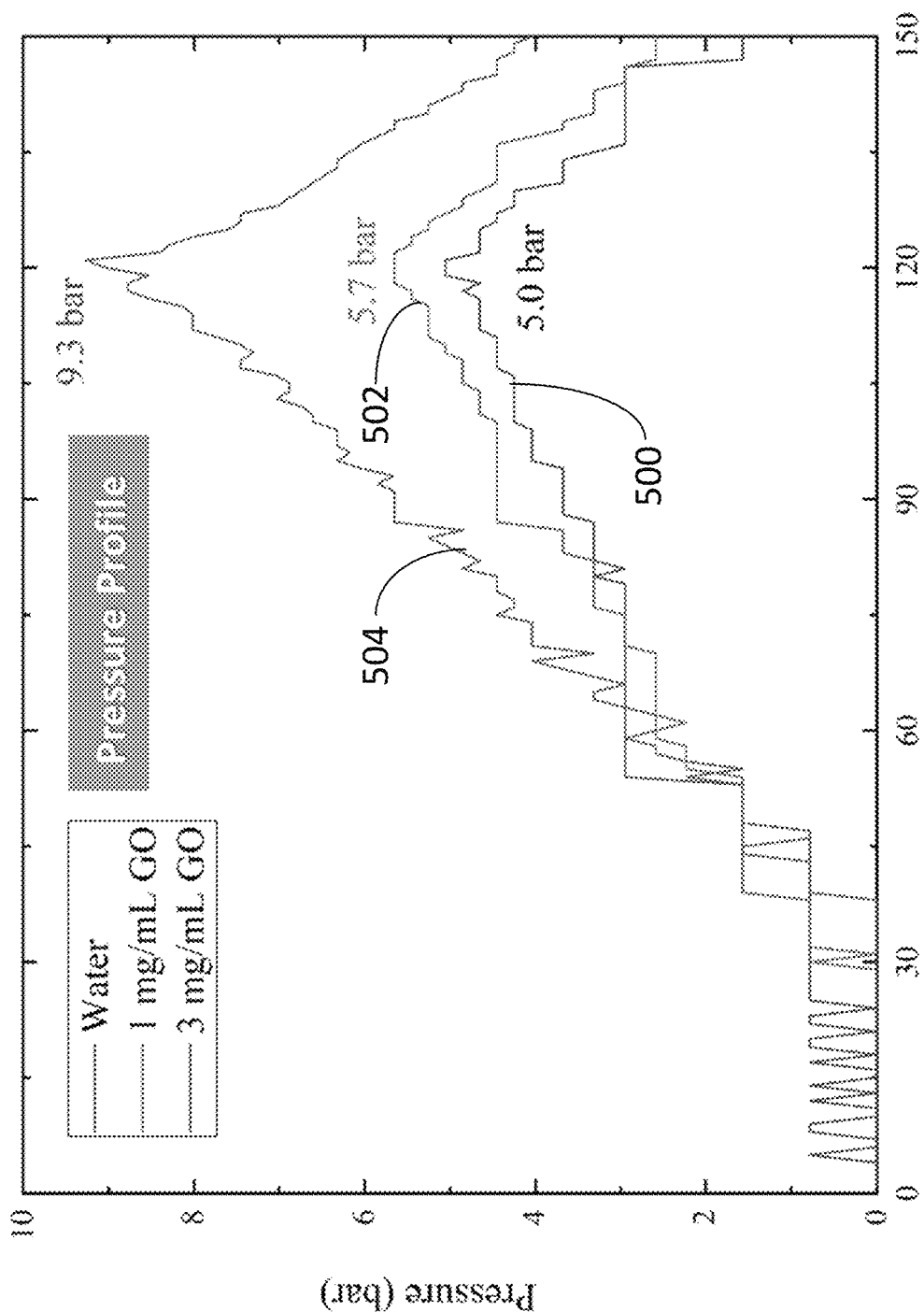

To validate the MACE processing mechanism, three samples with the same volume, including de-ionized water, 1 mg/mL GO solution, and 3 mg/mL GO solution, were processed by the microwave oven at a constant power of 50 W for 120 seconds. The temperature and pressure profiles with respect to the microwave processing time are shown in FIGS. 4 and 5. As depicted in FIG. 4, the highest temperature for each sample was achieved at the end of the microwave processing, as a result of the continuous energy input. Among these three samples, the GO solution of 3 mg/mL showed the highest final temperature, 155° C. The final temperature of the GO solution of 1 mg/mL was 145° C., higher than that of the de-ionized water, 140° C. These results indicate that the temperature increase of the system during the microwave heating is affected by the type of material and its concentration. Since the actual mass percentage of GO in the solution was about 0.1%, the change in heat capacity of the whole solution is negligible. The higher temperature in the GO solution was not because of such small difference in heat capacity but the total energy absorption from microwave interaction. The presence of GO sheets in water can increase the average microwave absorbance of the system, indicating that the microwave absorbance of GO sheets is higher than that of water. Due to the different microwave absorbance, the GO sheets obtained more energy from the microwave compared with the water, and thus the instant temperature of the GO sheets should be higher.

Because of the dominant volume of water molecules, the heat loss from the test-tube to the environment is accomplished by the heat conduction of water molecules. Consequently, the total system energy change is composed of the microwave energy absorption and the energy loss caused by the heat conduction to the environment. The energy change of GO sheets during the microwave processing is affected by the energy absorption from the microwave and the heat loss to water, while the energy change of water is caused by the energy absorption from the microwave, the gaining in the heat conduction from the GO sheets, and the heat loss to the environment.

The efficient energy transfer during the microwave processing can be attributed to the non-uniform heating in the GO solution. This heating process allows the GO sheets to have an ultra-fast temperature increase, and with the constant microwave input into the system, the temperature of GO sheets is higher than the surrounding water. Thus, the input energy during synthesis using the MACE method can be effectively and efficiently transferred to the GO sheets, shortening holey graphene synthesis from hours to a few minutes.

FIG. 4 shows the temperature growth rates of the three samples (de-ionized water 400, 1 mg/mL GO solution 402, and 3 mg/mL GO solution 404) during microwave irradiation, with respect to the microwave processing time. Though these are only the temperature growth rate of the whole system within the test-tube, instead of the actual temperature growth rate on GO sheets, these values can still reflect the temperature growth of GO sheets and comparable with each other. The slope of the temperature increase of both the water and the 1 mg/mL GO solution in the lower temperature region (<110° C.) is higher than that in the higher temperature region (>110° C.). In comparison, the slope of the temperature increase of the 3 mg/mL GO solution does not show any significant change. The temperature growth rates of the water and the 1 mg/mL GO solution are about 1.7° C./s at lower temperature region. At a higher temperature region, the value reduces to about 0.5° C./s. In this region, the temperature growth rate of the 1 mg/mL GO solution decreases more slowly than that of the water, producing a final temperature during microwave processing of the former that is higher than that of the latter.

The lower temperature growth rate at higher temperature region of all the samples indicates the increased heat loss to the environment due to the increased amount of high-pressure water steam coming out from the boiling water. Though the temperature growth rate of the 3 mg/mL GO solution is lower than that of the rest of the samples at the lower temperature region, there is no sudden drop in temperature growth rate during the microwave processing, and instead, the temperature growth rate undergoes a constant decrease after reaching 70° C. and remains at relatively high level before the end of processing. Since the heat loss of the three systems should be the same and is mainly accomplished by the water due to the low mass percentage of GO in the solution, the heat generation in the 3 mg/mL GO solution by the energy transfer from the microwave should be higher than those in the rest of the samples. This indicates that GO possesses better microwave absorbance than the water molecule. As a result, an increased number of GO sheets in the system can produce greater heat during the interaction of the GO lattice with the microwave. FIG. 5 shows the pressure profile during the microwave processing of the three samples (de-ionized water 500, 1 mg/mL GO solution 502, and 3 mg/mL GO solution 504), which reflects the instant temperature of the water. The trend of each curve in FIG. 5 agrees with the above results.

Density function theory calculations were performed to verify the oxidation mechanism between GO and $H_2O_2$. In this calculation, four graphene-related structures were used to determine the possible reaction results between GO and $H_2O_2$, including graphene, GO (one epoxy group in each unit cell of graphene), defected graphene (a six-atom ring is taken away from the intact graphene lattice), and defected GO. Each of the calculations ends once the global minimum of the system energy is achieved. The energy change from the start to the end of the calculation indicates the energy barrier of each reaction to take place, which can also suggest the most possible reaction during the oxidation according to Bose-Einstein statistics.

Calculated results show that both defected graphene models exhibit a low energy barrier: −7.06 eV for defected graphene and −7.03 eV for defected GO. After the oxidation by $H_2O_2$, the unpaired $sp^2$ carbon atoms around the defect edge will be linked with an oxygen atom. In the defected graphene model, the other unpaired $sp^2$ atom at the edge will pick up the rest of the $H_2O_2$ molecule, a hydroxyl group and a C—H bond, while in the defected GO model, the $H_2O_2$ molecule, after losing an oxygen atom, forms a water molecule that no longer participates in any reaction. Un-defected models are difficult to react with $H_2O_2$ molecules. Chemical bonding is hard to form in both models. Given these facts, it is suggested that defects are indispensable for the oxidation by $H_2O_2$. In the defected GO model, a C=C bond opens between a carbon atom at the edge site and a second nearest carbon atom to the edge sites, forming a new defect near the original one. This may be due to the epoxy groups having weakened the C=C bonding strength, which can be broken more easily under strain. Compared to defected graphene, defected GO can provide more active sites (loosely bonded atoms) for the next etching process.

Molecular dynamics (MD) simulation was carried out to verify the etching mechanism of GO sheets under microwave heating. To simulate the microwave heating of GO, a constant temperature increase (8 K/fs) was applied on the GO sheet until it reached the target temperature. The GO sheet was then annealed at the target temperature. During the simulation, the gaseous productions, such as CO, $CO_2$, $H_2O$, were removed after formation. The simulation continued until the structure of the graphene oxide sheet was stabilized, indicating that there was no obvious atom loss on the GO sheet.

Figure 6:
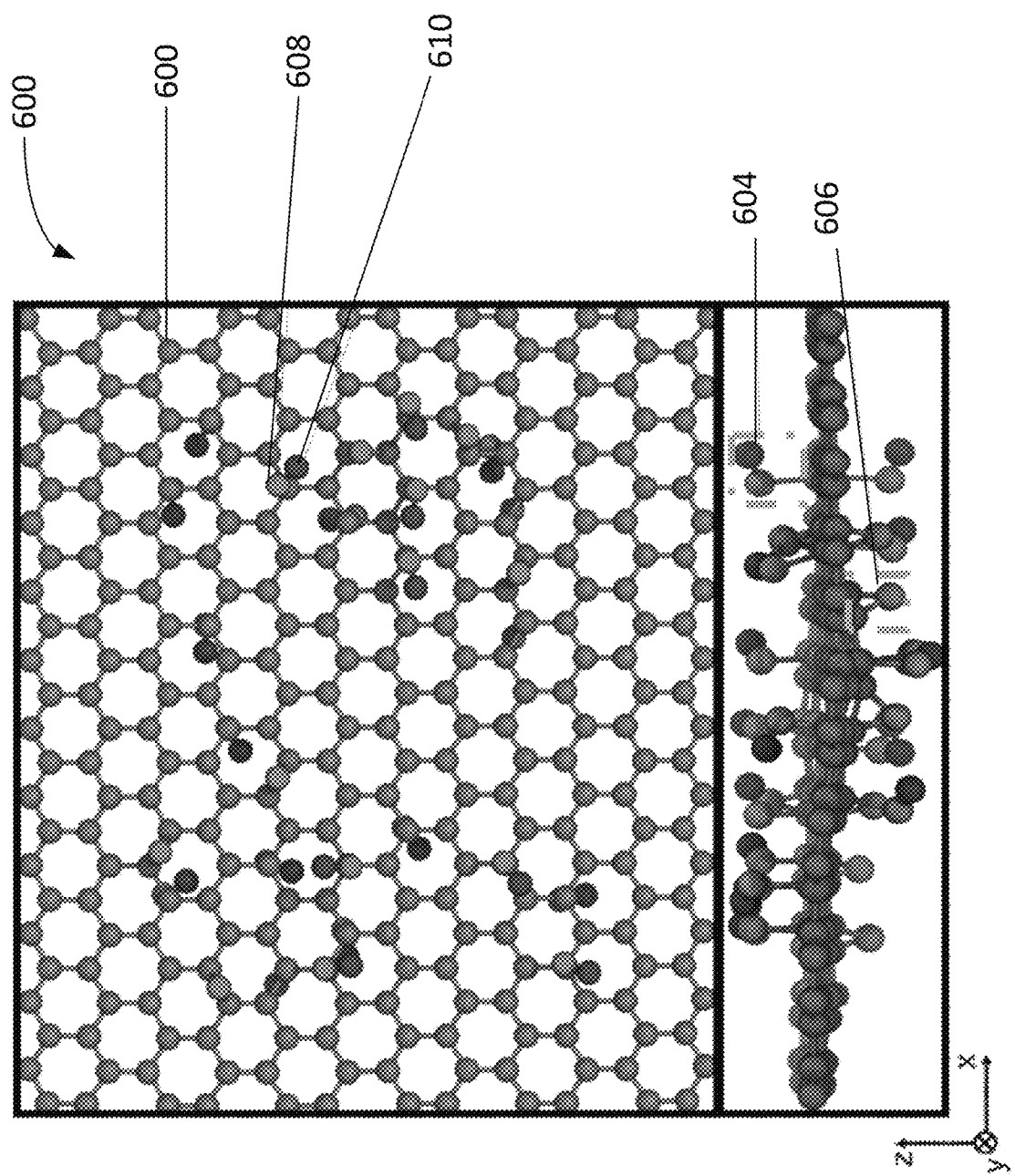
FIG. 6 depicts the initial structure of graphene oxide before annealing.
Figure 7:
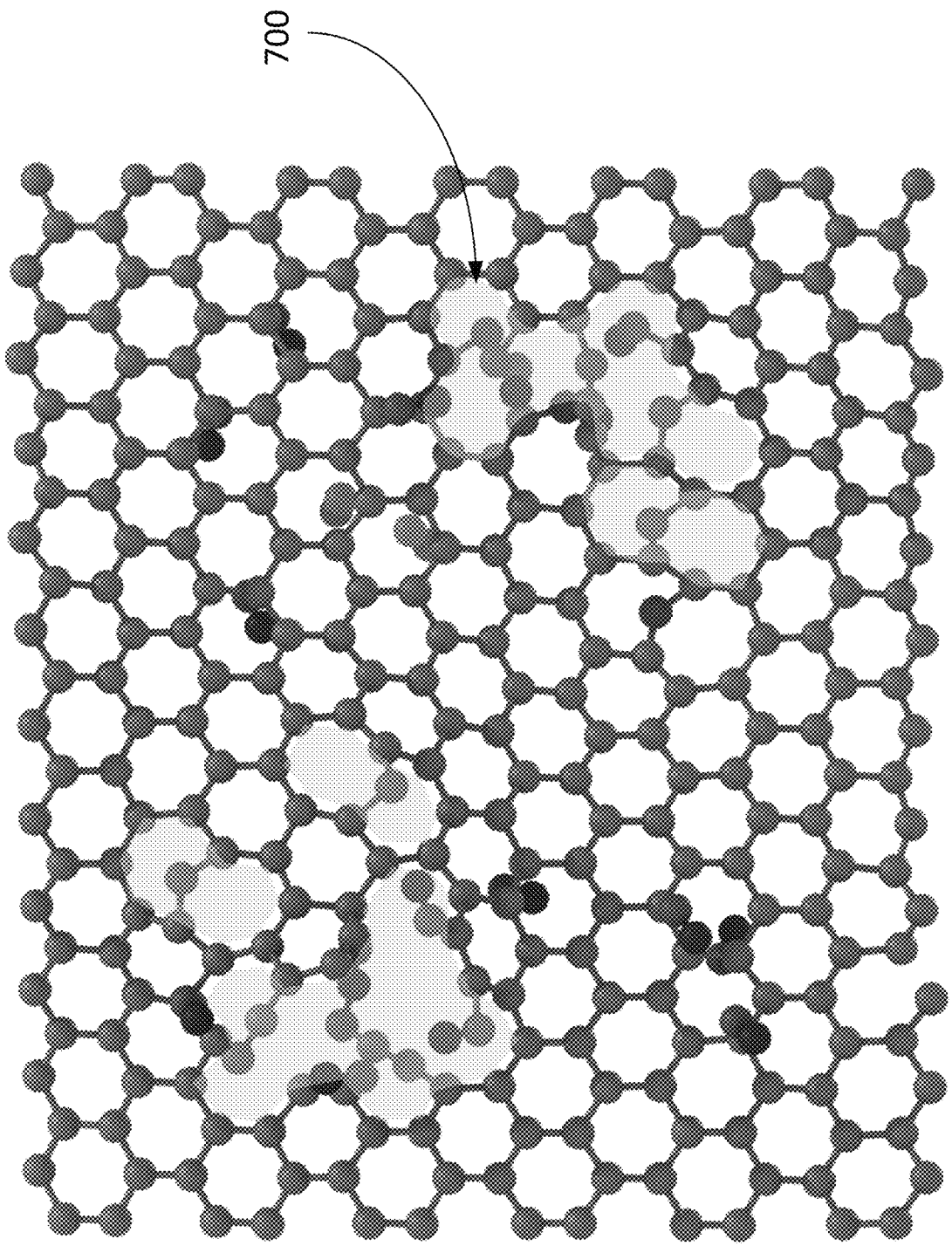
FIG. 7 depicts the structure of graphene oxide after annealing.

The starting structure of the GO model, as shown in FIG. 6, is a graphene sheet 600 (with carbon atoms 602) randomly anchored by functional groups including hydroxyl groups 604 and epoxy groups 606, both including oxygen 608 and hydrogen 610. After annealing at 1000 K, a few carbon atoms 602 were removed from the GO sheet 600, and several six-atom rings 700 were removed due to the breakage of C=C bonding, as shown in FIG. 7. Defects and infant holes emerged in these locations where there were functional groups. Thus, the etching of GO can be attributed at least in part to the activity of functional groups under high heat input. This is consistent with the experimental finding that thermal annealing of GO normally results in the generation of vacancies and defects 36. Though the temperature growth rate (8 K/fs) is significantly larger than the measured value (<5 K/s) in the test-tube during the MACE process, it is reasonable to use such a high temperature increase rate since the MD simulation does not consider the heat loss to the environment, and the actual processing time is too long for the MD simulation.

After annealing at different temperatures ranging from 1000 K to 3500 K, the final structures of the GO sheet exhibits significant differences. The final stabilized structures show an increase in defects and larger holes on the GO sheet with higher annealing temperatures. Obvious degradation of the graphitic lattice occurred when the GO sheets was annealed at the temperature above 3000 K. The atom loss in the simulation system did not continue growing at the same temperature. This is because there was no heat input after the temperature reached the target value. This suggests that only a constant heat input can maintain the atom removal from the GO sheets.

Figure 8:
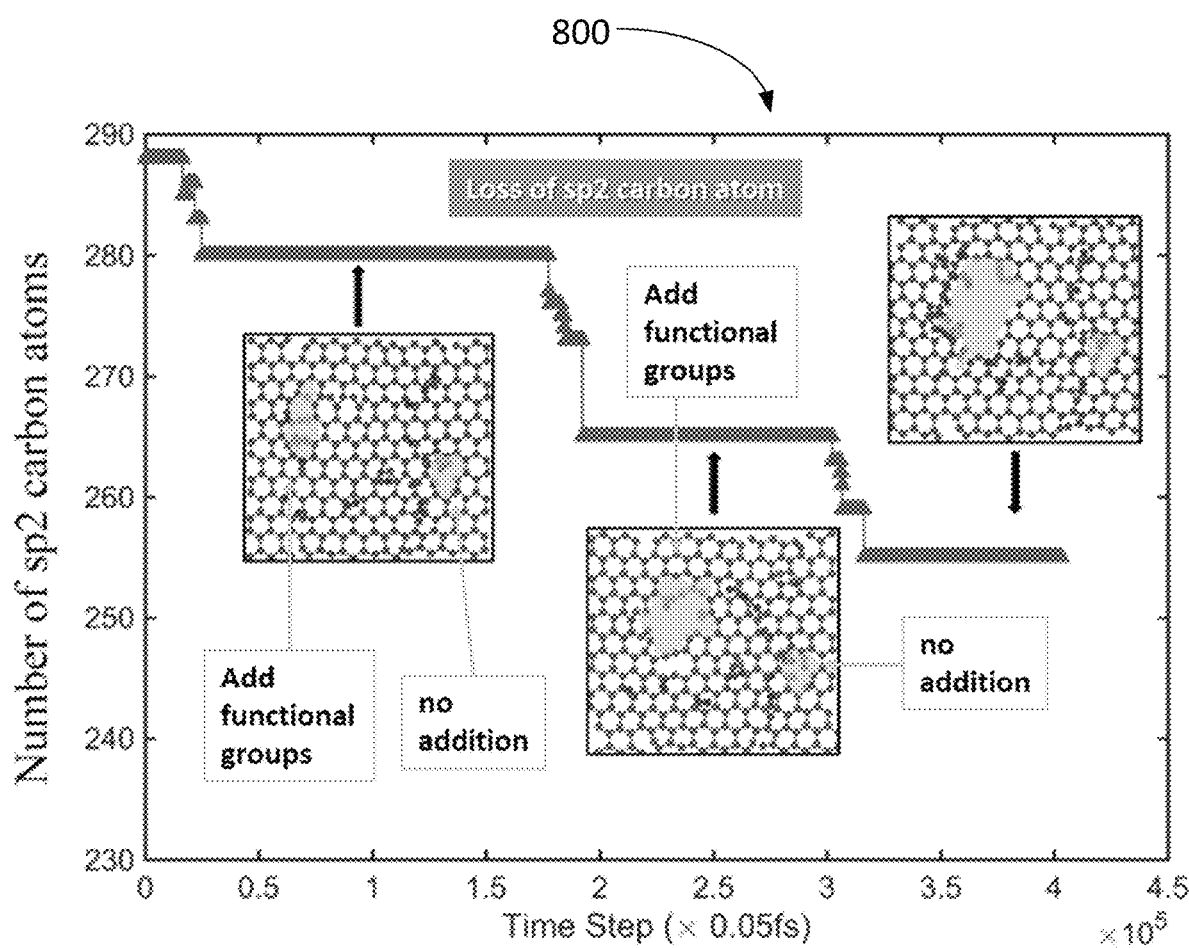
FIG. 8 depicts cycling annealing-oxidation of graphene oxide and $sp^2$ carbon atom loss as a function of time.

To simulate the etching process accompanied with the oxidation of GO by $H_2O_2$, according to the DFT results, additional functional groups (epoxy and hydroxyl) are added to the carbon atoms near the defected areas after each time the structure of GO sheets stabilized under annealing. As shown in FIG. 8, the cycling annealing-oxidation process 800 can continue reducing the number of $sp^2$ carbon atoms and enlarging the defected area to larger holes. It is noticed that the larger holes on GO sheets grow faster than the smaller holes. This suggests that the C=C bonds around the edge of the larger holes are weaker than those of the smaller holes. Thus, the growth of holes on GO sheets is not homogeneous. To obtain uniformly distributed nanoholes on GO sheets, the number of defected areas or infant holes on GO sheets may be increased before the MACE process. In addition, the preferential hole formation during the cyclic oxidation-etching process could be used to effectively control the hole size during the MACE synthesis.

The effects of defects and functional groups on the MACE synthesis of holey graphene were verified. As previously mentioned, defected areas on GO sheets can lower the energy barrier of the reaction between GO and $H_2O_2$, and the defected areas are more active during the etching process. Thus, if the defects can be planted on the GO sheets before the MACE process, the hole formation should be much easier. As previously discussed, the simulation results demonstrated that the annealing of GO can produce defects and infant holes.

Figure 9A:
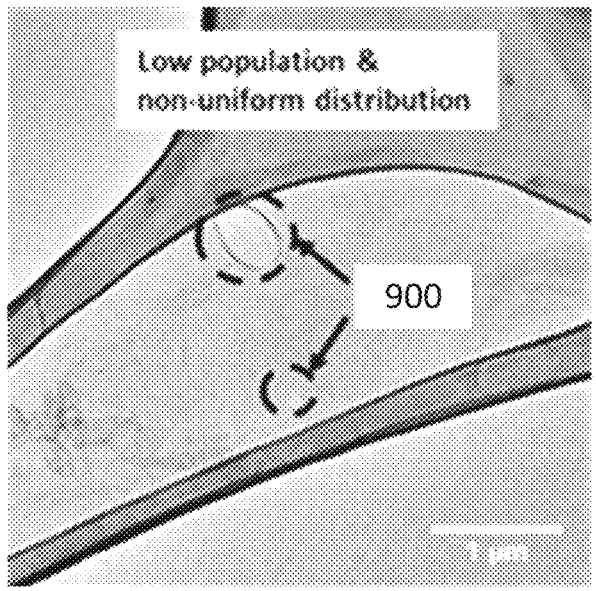
FIGS. 9A-9D show TEM images of holey graphene oxide synthesized with various pretreatment processes.
Figure 9B:
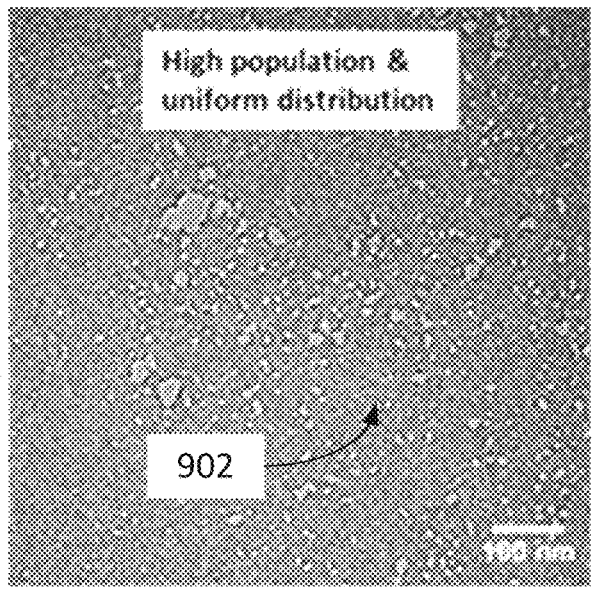
Figure 9C:
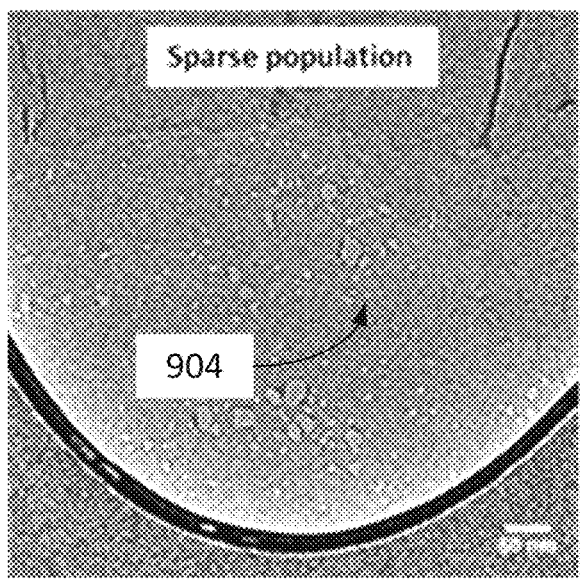
Figure 9D:
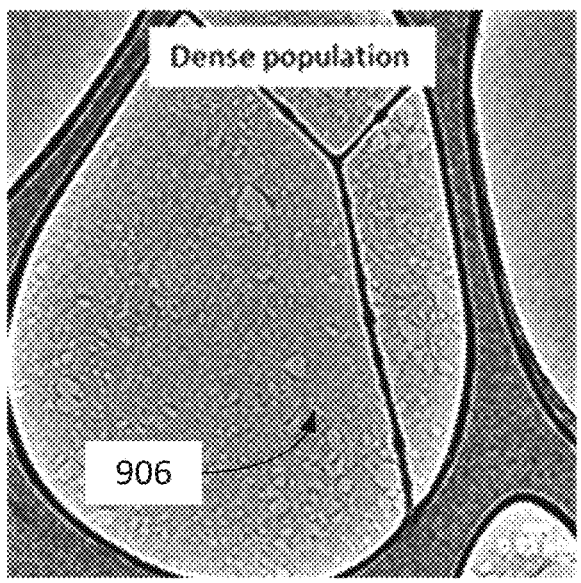

A group of GO solutions pretreated with microwave radiation for different processing times were used to verify the assumptions that the defects on GO sheets can be planted on GO sheets by microwave heating and can be further used to control the synthesis of holey graphene. As shown in Table 2, the Raman spectra of GO pretreated for a longer time first show an increasing ID/IG ratio and FWHM of G band, and then a continuous decrease in these two values. However, there is no pattern of the changes in the position of G band. Thus, the level of defects can be increased by extending with the pretreatment time. As shown in FIGS. 9A and 9B, the TEM images exhibit the structural difference of the hGO sheets without pretreatment and with the pretreatment, respectively. After the MACE process in the same condition, the hGO without pretreatment shows a low population and non-uniform distribution of nanoholes 900, while the hGO with pretreatment shows a high population and uniform distribution of nanoholes 902. This is consistent with the computational results. The enlargement of holes on GO sheets during the MACE process is preferential to occur for the larger holes. Thus, if there is no defect seeding accomplished by pretreatment, the number of defected areas is too small, and the first generation of holes continue to react with $H_2O_2$ and becomes increasingly larger. The larger holes hinder the growth of smaller holes. As a result, as shown in FIGS. 9A and 9B, for hGO without pretreatment, the number of holes is less, and the size difference is much larger compared to those with pretreatment. As shown in FIGS. 9C and 9D, the TEM images of hGO samples processed with the same microwave-pretreatment and different times in MACE exhibited distinctions in populations, while the average hole sizes 904, 906 for the two samples, respectively, did not obviously differ. This is believed to be because the level of defect seeding was the same between the two samples. A longer MACE time will expose more seeded defects and enlarge them when the hole size difference is not too large. Given these facts, it is understood that the population and the uniformity of the hole size can be controlled by defect seeding via microwave pretreatment.

TABLE 2

The values of the intensity ratio of D band to G band, full width at half maximum, and peak position of G band in Raman spectra of GO and pretreated GO with different processing time.

| Sample | ID/IG (Amplitude) | FWHM (G band) | Position (G band) |
|---|---|---|---|
| GO | 1.25 | 84 cm$^{-1}$ | 1588 cm$^{-1}$ |
| GO pretreated 3 min | 1.30 | 112 cm$^{-1}$ | 1584 cm$^{-1}$ |
| GO pretreated 5 min | 1.17 | 87 cm$^{-1}$ | 1593 cm$^{-1}$ |
| GO pretreated 7 min | 1.10 | 85 cm$^{-1}$ | 1589 cm$^{-1}$ |

Computational results indicate that the functional groups play a role in the etching process of GO. Only atoms at locations that have functional groups can be etched. Thus, partial reduction via microwave pretreatment can be used to control the etching of GO.

The TEM images for hGO pretreated for 90 seconds and 180 seconds exhibited differences in hole size. As previously discussed, hGO with higher levels of pretreatment (e.g., the one pretreated for 180 seconds) is expected to have a lower number of functional groups. Thus, the partial reduction via microwave pretreatment resists the hole enlargement by randomly removing the functional groups on GO sheets.

Another effect of functional groups is that a smaller number of functional groups provides increased electrical conductivity and heat conductivity. Thus, the microwave absorbance the GO sheets can be increased by partially removing the functional groups. Temperature profiles of GO solutions heated twice by microwave radiation at 200 W and 300 W show a that higher power input resulted in enhanced absorption at the second run of microwave heating, which could be used to further increase the kinetics of the MACE process.

The electrochemical properties of rGO and r-hGO with different nanohole features (including dense population and large size, dense population but small size, and sparse population) in 1 M $Na_2SO_4$ were evaluated to verify the improvement in ion transfer rate of r-hGO. All the r-hGO samples (sparse, dense, and dense and large) exhibited higher specific capacitance than rGO. Among them, r-hGO with dense and large nanoholes demonstrated the best specific capacitance, likely as a result of the increased ion diffusion channels in the sample that allow for larger capacitive current. Significant improvement in specific capacitance can be observed between the samples with dense and sparse population of nanoholes, suggesting the importance of the number of nanoholes in contribution to the capacitance. The EIS of the samples, which indicates that the r-hGO samples with dense population of nanoholes also have better charge transfer conductivity, can be accredited to the larger numbers of chemically activated edge-site carbon atoms around the nanoholes in those samples. These chemically activated atoms can also contribute to the increase in pseudo-capacitance, which can be found in the charging cycle at the lower voltage range.

The improvement of charge transfer rate of holey graphene was verified by comparing the performance of rGO and r-hGO with different nanohole features in the electrolyte of 5 mM $K_3Fe(CN)_6$ and 0.1 M KCl. The r-hGO samples (sparse, dense, and dense and large) show multifold improvements in redox activity. Since the redox activity is largely dependent on the charge transfer conductivity from the electrochemical interface to the electrode, it is suggested that r-hGO has superior charge transfer conductivity than rGO. The EIS measurements support this finding and indicate that holey graphene has a higher charge transfer rate. The difference in redox peaks between the two r-hGO samples with dense population of nanoholes was not obvious, while the peak range of the sample with larger hole size was slightly smaller. This suggests that larger holes can promote a faster redox reaction, which can be attributed to a faster ion transfer through the larger holes.

Example 2

Graphite flakes (50+ mesh), potassium permanganate, sulfuric acid (98 wt. %), hydrogen peroxide aqueous solution (30 wt. %), chloride acid (1 M), sodium sulfate, potassium ferricyanide, potassium chloride, and ethanol were purchased from Sigma-Aldrich. The GO aqueous solution was prepared by the improved Hummer's method.

The 3 mg mL$^{-1}$ GO aqueous solution (3 mL) was added into a glass tube sealed by a PTFE cap and irradiated in a microwave reactor (Anton Paar Monowave 400, 2.45 GHz) at a constant power of 50 W for 90-360 s with magnetic stirring at a speed of 600 rpm. An infrared thermometer recorded the temperature profile per second, and a pressure sensor collected the variation of pressure inside the reaction tube. Compressed air flow was used to cool down the solution to room temperature after microwave irradiation.

The pretreated GO solution and hydrogen peroxide were mixed in a reaction tube with a volume ratio of 5:2. The mixture was irradiated in the microwave reactor at a constant power of 50 W for 45-180 s. After cooling, the solution was centrifuged at 12 k rpm for 15 min to remove residual hydrogen peroxide. The precipitate was then re-dispersed in deionized water to form the hGO aqueous solution. The hGO aqueous solution was irradiated in the microwave reactor to 220° C. and held for 90 s to obtain the rhGO aqueous solution.

The morphologies of graphene sheets were characterized on an aberration-corrected TEM (FEI Titan 300/80) using the electron beam with an acceleration voltage of 300 kV. AFM was performed on a Bruker Multimode 8 system using the contact mode. Chemical compositions of graphene samples were analyzed on an XPS system (VG Escalab 220i-XL) with a monochromatic Al K-alpha source. Raman spectra were collected using a 532-nm laser. Each spectrum was scanned 10 times with durations of 1 second per scan. The spectrum center and filter grating were 2050 $cm^{-1}$ and 600 g $mm^{-1}$, respectively.

The Vienna Ab-initio Simulation Package was used for all the DFT calculations. The plane waves used in the calculations had an energy cutoff of 500 eV. The Perdew-Burke-Ernzerhof functional and the corresponding version of standard potential data sets generated by the projector augmented-wave method were also used. All the supercells have a vacuum spacing of 18.0 Å and a single k point (F) was used for the k-point sampling. The atomic coordinates were fully optimized until the forces were converged to 0.01 eV/Å. In MD simulation, the reactive force-field (ReaxFF) is utilized to describe the bond association/disassociation process during the thermal annealing of GO. Structure optimization with ReaxFF was performed at room temperature. A Berendsen thermostat with a damping parameter of 100 time steps was used to control the system temperature. The time step is 0.05 fs. Molecular by-products released from the GO sheet were removed periodically every 10 fs to mimic the experimental reduction environment against vacuum.

The electrochemical measurements were carried out on a CH Instruments 660E workstation at ambient condition using a three-electrode setup that included a 0.5 mm Pt wire as the counter electrode, a Ag/AgCl reference electrode in 1 M KCl (+0.235 V vs. standard hydrogen electrode), and a glassy carbon working electrode (GCE). The working electrode was prepared by drop-casting 10 μg active material on a freshly polished GCE (polished with 0.05 μm alumina powder and rinsed by deionized water). EIS was performed at the open-circuit voltage from 1 MHz to 1 Hz at a bias voltage of 5 mV.

The morphology evolution of the pristine GO, dGO, and hGO sheets at different stages of fabrication were characterized by transmission electron microscopy (TEM). The pristine GO sheet did not show any recognizable holey region on the basal plane, and the color of its aqueous solution was light brown. Within an area of the same size on the dGO sheet, two nanoholes with diameters of about 0.5 and 3.0 nm were found, and the color of the dGO solution turned darker due to the reduction of GO by the microwave pretreatment. Yellow regions suggest that the functional groups are depleted in the areas around the nanoholes, while other areas on the dGO sheet are still covered by functional groups. This suggests that the formation of the nanoholes on the dGO sheets is related to the removal of functional groups. However, the sole reduction process (i.e., the removal of functional groups) does not appear to bring about the formation of abundant nanoholes, and an etching reagent (e.g., hydrogen peroxide) can facilitate the process. With the coupling effect of microwave irradiation and chemical etching, the nanoholes with a high density and diameters up to about 25 nm are observed on the basal plane of the hGO sheet. According to the atomic force microscopy (AFM) images, no obvious change is identified from GO to hGO in both thickness (about 1 nm) and size (m-scale), implying that both the microwave exposure and etchant concentration are in the appropriate ranges to avoid disintegrating the GO sheets into small pieces.

Figure 10C:
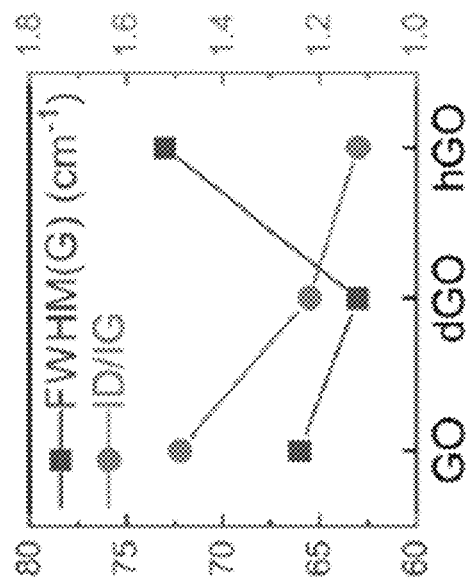
FIGS. 10A-10C show XPS spectra, C/O and C/(O+N+S) atomic ratios obtained from XPS spectra, and full width at half-maximum of the G band (FWHM(G)) and intensity ratios of the D to G band (ID/IG) obtained from Raman spectra, respectively.
Figure 10B:
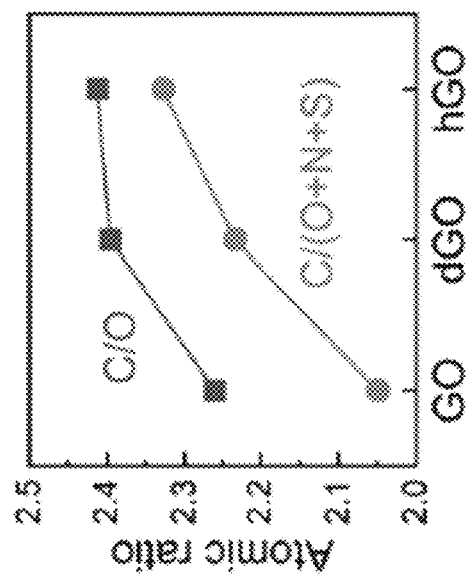
Figure 10A:
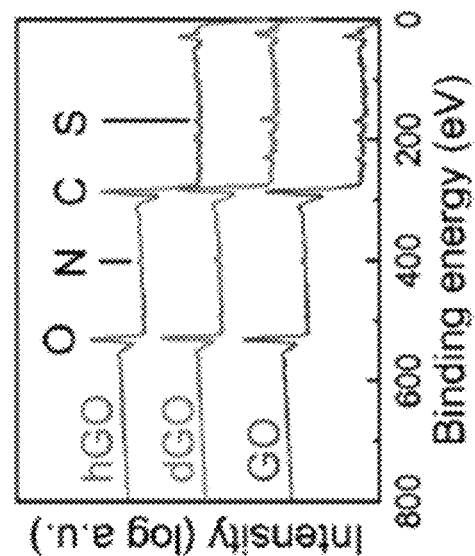

The X-ray photoelectron spectroscopy (XPS) spectra of the pristine GO, dGO, and hGO sheets in FIG. 10A show that they are mainly composed of C, O, S, and N atoms. By calculating the C/O or C/(O+N+S) atomic ratio from the XPS spectra, as shown in FIG. 10B, the constituent change during each fabrication step can be analyzed. As indicated by the higher C/O ratio of dGO relative to GO, the microwave irradiation during the pretreatment causes a partial removal of the oxygen-containing functional groups from GO sheets. If the sulfur- and nitrogen-containing groups are considered, the pretreatment still brings an increase in terms of C/(O+N+S) from 2.05 to 2.23. After the MACE, the hGO sheets show a negligible increase of the C/O ratio from 2.40 to 2.41, suggesting that the losses of carbon and oxygen atoms were balanced during this step. The oxygen supply of hydrogen peroxide led to the formation of new oxygen-containing groups on GO sheets, equalizing the removal of oxygen-containing groups caused by the microwave irradiation. In contrast, conventional chemical-etching methods typically show a lower C/O ratio after etching. The increase of the C/(O+N+S) ratio from 2.23 to 2.33 after the MACE indicates that the removal of sulfur- and nitrogen-containing groups on GO sheets can be significant in this step.

Raman spectroscopy was employed to characterize the disorder level of GO sheets, i.e., the distortion of $sp^2$ graphitic rings on the graphene lattice affected by both defects and functional groups. It is believed that the disorder level of GO grows with the full width at half-maximum (FWHM) of the G band, one of the characteristic peaks in the Raman spectra of graphitic structures. As shown in FIG. 10C, the FWHM(G) of GO decreased from 66 to 63 $cm^{-1}$ after the pretreatment and increased to 73 $cm^{-1}$ after the MACE, suggesting that the graphitic arrangements of the graphene lattice are first restored by the pretreatment and then distorted by the MACE. Although the pretreatment creates the vacancy defects that distort the graphene lattice, the disorder level of dGO is affected more by the removal of functional groups during the pretreatment. The MACE, on the other hand, can promote the disorder level by forming the nanoholes that cause large lattice distortion on hGO sheets. In addition, the intensity ratio of the D to G band (ID/IG) is another indicator of the disorder level on GO sheets. With the increase of FWHM(G), the ID/IG ratio of the single-layer graphene first grows within a low-disorder range and then reduces when entering the high-disorder range. Here, the correlations between FWHM(G) and ID/IG of GO, dGO, and hGO samples exhibit the similar trends. The values of FWHM(G) and ID/IG become lower from GO to dGO, while the hGO samples show mostly higher FWHM (G) and lower ID/IG than GO. This suggests that the dGO samples are in the low-disorder range where ID/IG increases with the disorder level, while the hGO samples are in the high-disorder range where ID/IG reduces with the disorder level. Also, it is found that FWHM(D) is a similar indicator as ID/IG to determine the disorder level of GO.

To understand the effect of pretreatment on the size and population of nanoholes, a group of dGO samples were prepared with pretreatment duration of 90 (denoted as dGO-PS), 180 (denoted as dGO-PM), and 360 s (denoted as dGO-PL), respectively. After the MACE with the same condition (at 50 W for 90 s), the samples were denoted as hGO-PS, -PM, and -PL, respectively. TEM images of the hGO sheets were obtained. The statistics data of the nanoholes in the TEM images, including the total area percentage, population, range of diameter, median diameter, and average diameter, were collected and compared in FIG. 11A.

Figures 11A, 11B, 11C:
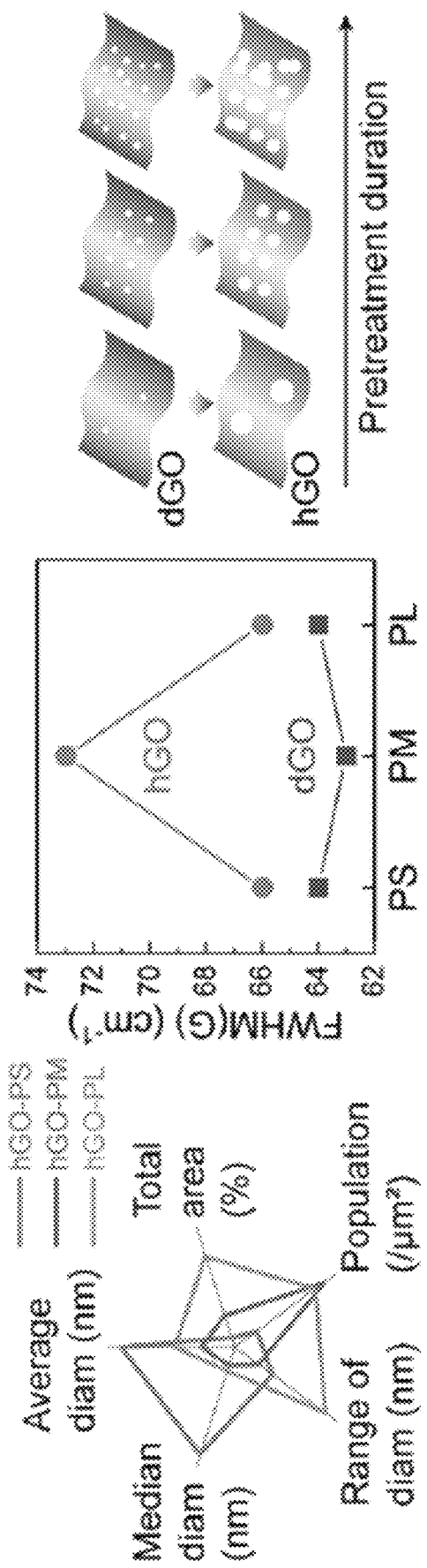
FIG. 11A is a radar chart comparing the total area percentage, population, range of diameter, median diameter, and average diameter of the nanoholes from TEM images described in Example 2.
FIG. 11B shows FWHM(G) obtained from the Raman spectra vs. pretreatment durations of defected graphene oxide (dGO) and hGO.
FIG. 11C depicts the effect of pretreatment on the microstructure of hGO.

With the shortest pretreatment, the TEM image of hGO-PS displays a few sparsely scattered nanoholes with the range of diameter widely spread from 7 to 22 nm. The nanoholes of hGO-PS exhibit the lowest population (45 $\mu m^{-2}$) and area percentage (0.6%) because the 90-s pretreatment only creates a limited number of vacancy defects as the formation sites of nanoholes. The low defect density on the dGO-PS sheets is related to the low reduction level of dGO-PS indicated by the Raman and XPS results of dGO-PS: the C/O and C/(O+N+S) ratios of dGO-PS are the lowest among all the dGO-P samples; the decrease in ID/IG from GO (1.49) to dGO-PS (1.33) is also the smallest. As a result, the formation of nanoholes on the hGO-PS sheets is not prominent after the MACE. This can be also confirmed by the negligible increase in FWHM(G) from 64 to 66 $cm^{-1}$ (FIG. 11B). Nevertheless, the nanoholes of hGO-PS have the largest average and median diameters (13.4 and 11 nm). During the MACE, the limited population of defect regions on the dGO-PS sheets causes the constant etching of a few preferential locations on the lattice where more carbon atoms are removed compared to the other samples.

With longer pretreatment, the nanohole population of hGO-PM grows to 1687 $\mu m^{-2}$, bringing the high area percentage (2.1%) that generates the highest disorder level among all the samples (indicated in FIG. 11B by the largest FWHM(G) of 73 $cm^{-1}$). The nanoholes of hGO-PM exhibit the smallest values in the range of diameter (2.5-13.0 nm), average and median diameters (4.0 and 3.5 nm). As indicated by the lower FWHM(G) of dGO-PM relative to dGO-PS (FIG. 11B), the longer pretreatment causes a higher reduction level of dGO-PM, meaning the formation of more vacancy defects on the dGO-PM sheets. During the MACE, the dGO-PM sheets can provide many chemically active sites for the etching reaction, resulting in a uniform formation of abundant nanoholes on the hGO-PM sheets.

As the pretreatment duration increases to 360 s, the total area percentage of nanoholes of hGO-PL increases to 6.0% with a large average diameter of 7.2 nm. As indicated by the largest C/O and C/(O+N+S) ratios among all the dGO-P samples, the highest reduction level of dGO-PL leads to large numbers of defects created during the pretreatment, promoting the nanohole formation on the hGO-PL sheets. Many nanoholes joined each other during the MACE, forming much larger nanoholes with the diameters up to 53 nm. The joining of nanoholes leads to a slight drop in population and a broader range of diameter on hGO-PL relative to hGO-PM. However, the diameters of most nanoholes are still smaller than 5 nm. In fact, assuming that the average diameter of nanoholes is constant under a same processing condition during the MACE, a theoretical nanohole population (that has eliminated the effect of joining) of hGO-PL can be estimated using the average diameter of nanoholes of hGO-PM (4.0 nm) and the area percentage of hGO-PL (6.0%). The calculated value is 4775 $\mu m^{-2}$, much larger compared to hGO-PM (1687 $\mu m^{-2}$). Thus, it is believed that the joining of nanoholes can be limited by varying the duration of MACE.

FIG. 11C illustrates the effect of pretreatment duration on the microstructure of nanoholes. With longer pretreatment, more functional groups can be removed from GO sheets, and a higher density of vacancy defects can be generated. During the MACE, these vacancy defects are constantly enlarged into nanoholes. Therefore, more nanoholes can be obtained on the hGO sheet with longer pretreatment. However, if the pretreatment is too long, the crowded nanoholes would join each other during the MACE, leading to the decrease of population. To effectively tune the population of nanoholes, the MACE duration can be adjusted accordingly to control the growth of nanoholes.

To study the effect of MACE, another group of hGO sheets were prepared on the growth of nanoholes. The GO solutions were first pretreated under microwave for 180 s (the same as dGO-PM) to obtain a decent defect density on dGO as demonstrated above. Then, the dGO samples were etched for 45 s (denoted as hGO-ES), 90 s (denoted as hGO-EM), and 180 s (denoted as hGO-EM), respectively. TEM images of the hGO-E samples were obtained, and the statistics data of the nanoholes were collected and compared in FIG. 12A.

After the MACE of 45 s, small nanoholes (5.6 nm) are observed on hGO-ES with a relatively low population (454 $\mu m^{-2}$), while the range of diameter is narrow (3.5-18 nm). The emerging of nanoholes from vacancy defects is more obvious than the size growth of nanoholes. This is believed to be at least in part because the short duration of MACE limits the etching of GO sheets. Both the C/O ratio and FWHM(G) (FIG. 12B) show no obvious change caused by the short duration of MACE.

Figures 12A, 12B, 12C:
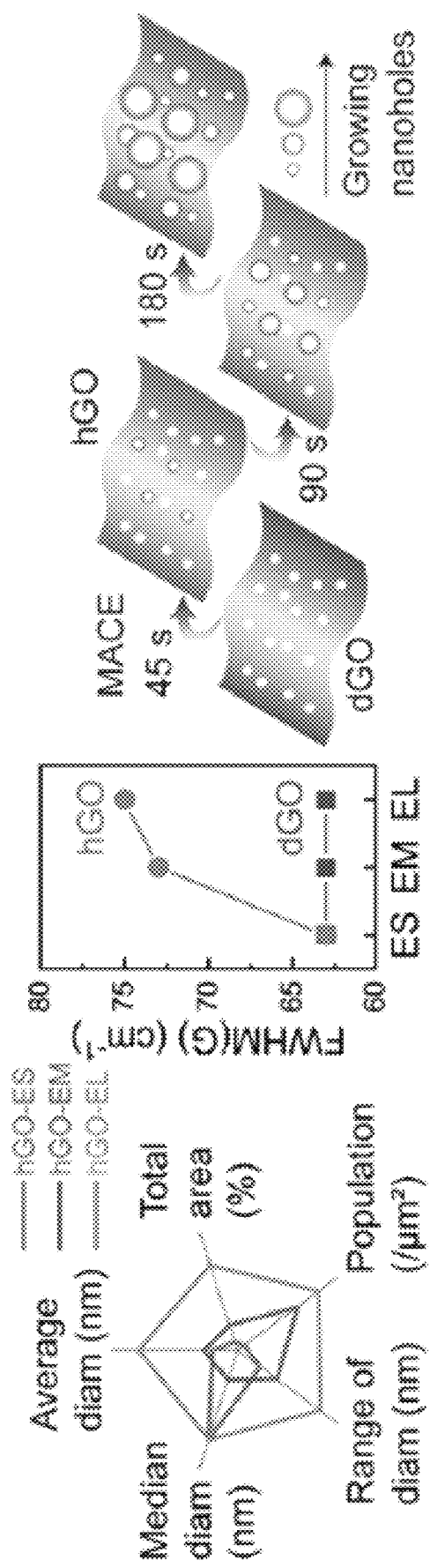
FIG. 12A is a radar chart comparing the total area percentage, population, range of diameter, median diameter, and average diameter of the nanoholes from TEM images described in Example 2.
FIG. 12B shows FWHM(G) obtained from the Raman spectra vs. pretreatment durations of defected graphene oxide (dGO) and hGO.
FIG. 12C depicts the effect of MACE on the microstructure of hGO.

The longer MACE brings a growth in the population of nanoholes to 1050 $\mu m^{-2}$. Compared to hGO-ES, hGO-EM shows a larger total area percentage of nanoholes (3.1%) and higher disorder level with FWHM(G) of 73 $cm^{-1}$ (FIG. 12B). The range of nanohole diameter of hGO-PM become broader (3.5-31 nm) because of the joining and preferential growth of nanoholes during the 90-s MACE.

The MACE of 180 s results in an increase both in the total area percentage (10.7%) and average diameter (10.3 nm) of nanoholes with a high population of 1295 $\mu m^{-2}$. The range of diameter further broadens (3.5-65 nm). Many joined holes with diameters over 20 nm are observed on the hGO-EL sheet. The disorder level of hGO-EL is the highest among all hGO-E samples, as indicated by FWHM(G) (FIG. 12B). Both the ID/IG and C/O ratios of hGO-EL abnormally increase after the MACE due to a higher reduction of GO induced by the microwave irradiation with long duration.

The mechanism of MACE is illustrated in FIG. 12C. In contrast to the effect of pretreatment, which mainly changes the population of nanoholes on hGO, the MACE process affects both the formation and growth of nanoholes by coupling chemical etching and microwave irradiation. With a moderate defect density on the dGO sheets, the longer duration of MACE brings a larger nanohole population but also the joining and preferential growth of nanoholes that increase the range of diameter and total area percentage. Therefore, the short duration of MACE is favorable to form the nanoholes with relatively uniform diameters, while the long duration of MACE contributes most to the high population and total area percentage of nanoholes. By tuning the duration of both pretreatment and MACE, the microstructural features of nanoholes can be effectively controlled.

Thermal Chemical Mechanism of MACE.

To unveil the thermal chemical mechanism during fabrication of holey graphene, the multiscale calculations based on the density functional theory (DFT) and molecular dynamics (MD) were carried out.

As demonstrated previously, the in-plane vacancy defects formed during the microwave pretreatment of GO sheets is related to tuning the size and population of nanoholes on hGO sheets. How these defects affect the chemical etching process between graphene and hydrogen peroxide during the MACE was investigated by calculating the internal energy changes of the chemical interactions between one hydrogen peroxide molecule and graphene, GO, defected graphene, and dGO, respectively. A 6×6×1 supercell was used to simulate the structure of graphene, adding to which epoxy models results in the GO structure. Each of the defected structure is obtained by removing a carbon atom from the center of the supercell. The calculation result shows that the hydrogen peroxide molecule typically does not react with pure graphene or GO, and typically reacts with the defected graphene (−7.06 eV) or dGO (−7.03 eV). The reaction with the defected graphene produces carbonyl, hydrogen, and hydroxyl groups on the edge-sites of the vacancy defect. For dGO, a carbonyl group emerges at the same site, and two graphitic rings are broken due to a detached C—C bond. The results suggest that hydrogen peroxide can oxidize the defected graphene or GO sheets by adding oxygen-containing functional groups to the vacancy-defected regions. The removal of carbon atoms that leads to the chemical etching of graphene or GO sheets is not observed due to the zero-temperature limit in standard DFT calculation.

To further study the interaction between hydrogen peroxide and GO that couple both microwave-thermal and chemical effects, the classical MD simulation is conducted. The model of a single-layer GO sheet is constructed using a periodical box of 3.4×3.2×6 nm containing 11×11 unit cells. Epoxy and hydroxyl functional groups are randomly added on both sides of the GO sheet, and the oxygen concentration is 12.5%. The GO sheet is first annealed at 1000 K for 7.5 ps with a heat rate of 13 K fs$^{-1}$ to mimic the microwave-thermal pretreatment. Note that, the annealing temperature herein is chosen according to a pre-fitted reactive force field, which is not comparable to experimental temperature conditions. But, under the solely thermal effect, it is observed that several vacancy defects are created on GO by the removal of carbon atoms and the breakage of C—C bonds. This confirms the pretreatment can lead to the formation of vacancy defects on GO by electromagnetic-wave-induced heating. The loss of carbon atoms or the breakage of C—C bonds on GO no longer occur after thermal annealing for a certain time (less than 2.5 ps). Therefore, the vacancy-to-nanohole transformation cannot be achieved by a solely thermal annealing. Per the results from the DFT calculations, additional hydroxyl and epoxy groups could be formed due to the oxidation effect of hydrogen peroxide and thus can be added to the edge-sites carbon atoms around the vacancy region (A). For side by side comparison, another vacancy region (B) is not added with any functional groups. Then, the model is annealed again under the same temperature for the same duration. The result shows that the vacancy A on GO is enlarged and transformed to a nanohole due to the loss of more carbon atoms and the breakage of more bonds until the functional groups are removed significantly. It suggests that the continuous growth of nanoholes on GO is caused by the coupling effect of both the electromagnetic-wave-induced heating and the oxidation by hydrogen peroxide. To confirm this idea, the addition of functional groups onto the edge-sites carbon atoms and the following annealing, are repeated for more cycles. The size of the nanohole A grows further, while vacancy B remains the same size after the same treatment of thermal annealing but without any etchant oxidation or functional groups addition. These results of MD calculations clearly demonstrate that the formation of nanoholes originated from the cyclic etchant oxidation process occurring at the edge-sites atoms around pretreated vacancies in graphene basal plane. This agrees well with the experimental observation above, that the density and size of nanoholes can be effectively controlled by adjusting either the density of the pretreated vacancies or the oxidation cycles, in other words, the pretreatment duration or MACE duration.

Rapid Fabrication Enabled by Selective Heating.

Besides the controllability of the nanohole features, the MACE method provides a promising solution to scalable manufacturing of holey graphene by reducing the total processing time from previous hour-scale to minute-scale. The rapid process is attributed to the in situ heat generation of GO sheets under microwave irradiation. To understand the heating mechanism of this method, three samples with the same volume (3 mL), including deionized water and two dGO aqueous solutions with concentrations of 1 and 3 mg mL$^{-1}$, were irradiated under microwave with the same power and duration (50 W and 120 s) starting at room temperature. No etchant was added in any of the samples to avoid the effect of etching reaction. The final temperatures are 140, 145, and 156° C. for the deionized water, 1 mg mL$^{-1}$, and 3 mg mL$^{-1}$ dGO solutions, respectively, and the final pressures of the three samples are 5.1, 5.7, and 7.7 bar, respectively. A higher dGO concentration leads to a greater energy absorption from the electromagnetic wave. The temperature rise of the dGO solutions can be composed of two parts: the temperature rise of water and that of dGO. In the 3 mg mL$^{-1}$ dGO solution, the water of total 3 g brings a temperature rise of 115° C., as indicated by the final temperature of deionized water, and thus the specific temperature rise per gram of water is 46.7° C. g$^{-1}$. Meanwhile, the dGO sheets of total 9 mg result in an extra temperature rise of 16° C., and the specific temperature rise of dGO should be 1777.8° C. g$^{-1}$, over 30 times of that of water.

Figure 13A:
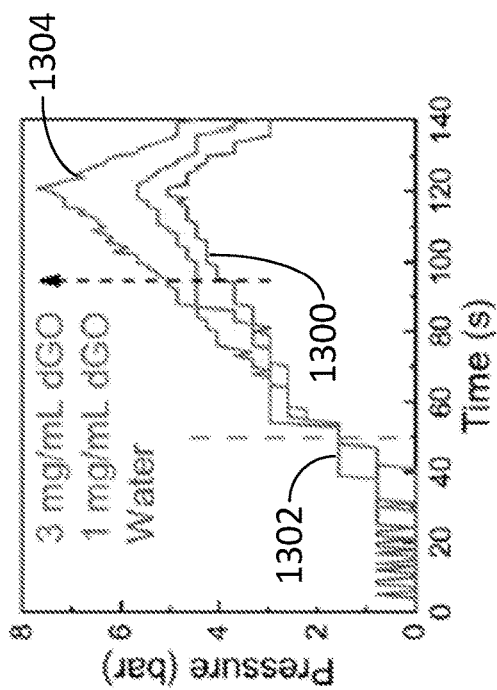
FIGS. 13A-13C relate to selective heating of defected graphene oxide (dGO) in aqueous solutions under microwave irradiation described in Example 2.
Figure 13B:
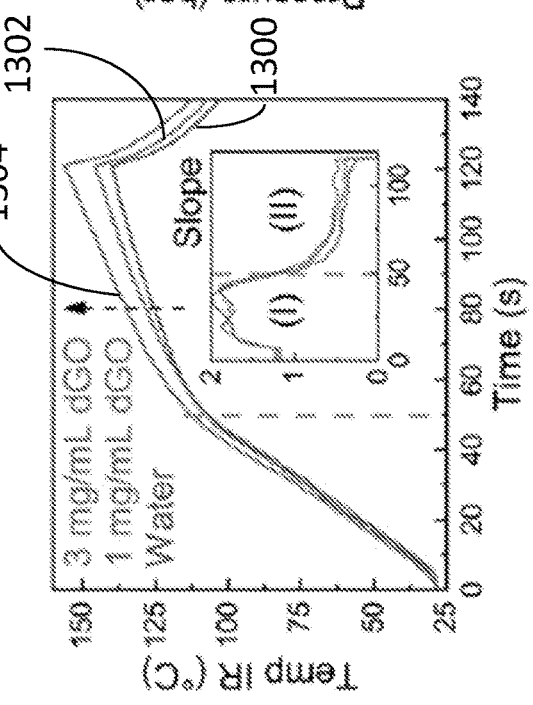
Figure 13C:
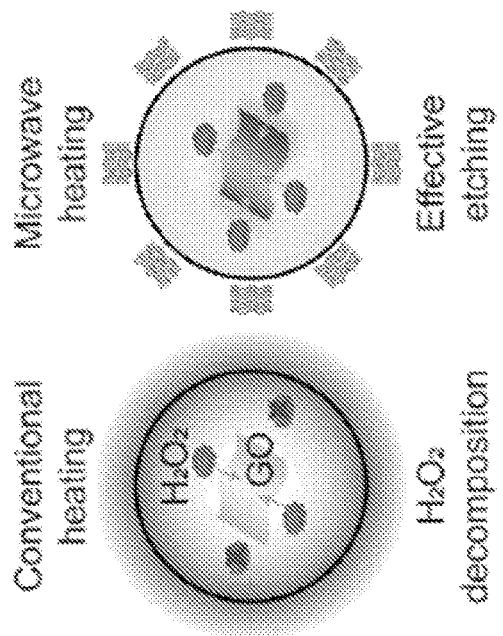

FIGS. 13A-13C are related to selective heating of dGO in aqueous solutions under microwave irradiation. FIGS. 13A and 13B show temperature and pressure profiles, respectively, of deionized water 1300 and the dGO solutions of 1 and 3 mg/ML, 1302 and 1304, respectively, processed under the same microwave irradiation. FIG. 13A, which shows a plot of the temperature increase rates, suggests the heating can be divided into two stages: in stage I (0-50 s), the temperature increase rates of the three samples show no obvious difference and fluctuate at around 1.8° C. s$^{-1}$; in stage II (50-120 s), the temperature increase rates all drop to around 0.5° C. s$^{-1}$, while the solution with a higher dGO concentration can keep a faster increase. The lower heating rate in stage II mainly results from the heat loss for the evaporation of water starting at about 50 s. Another factor causing the lower heating rates in stage II could be the lower dielectric heating of water under higher temperatures. Although the heating rates of the samples all reduce in stage II, the differences in heating rates among the samples become more obvious. This could be caused by the significant increase of the dielectric loss of GO above 100° C. With higher temperatures, the dielectric heating of water reduces, and that of dGO increases, leading to the greater differentiation in heating rates of the samples. Microwave radiation can cause local electron movements in the π-π network on graphene sheets, resulting in the localized Joule heating that can generate high-temperature plasma arcs on graphene powders within 1-2 s. This microwave-induced electronic heating is believed to differ from the dielectric heating mechanism that generally relies on the dielectric loss of non-metallic polarized molecules. The dGO sheets can provide both the defects and functional groups for polar movements and the regional π-π networks for local electron movements. Both dielectric heating and localized Joule heating could co-exist during microwave irradiation and cause intense heating on the surface of the dGO sheets. As a result, the dGO sheets in the solution can be selectively and efficiently heated by the microwave irradiation.

The actual temperature of the dGO sheets is difficult to directly monitor during microwave irradiation. Nevertheless, under the consideration of the selective heating mechanism, the temperature of the dGO sheets in the solution during microwave irradiation can be calculated using an analytic model. Briefly, the temperature rise of the solution or water is assumed to be determined by the microwave heating of water and dGO with no heat loss to the environment. Therefore, the heat solely generated by dGO sheets can be calculated. The higher temperature rise of dGO relative to water results in a heat conduction from the dGO sheets to their surrounding water molecules. Assuming the temperatures of dGO and water are equalized in each second, the temperature difference before equalization can be calculated using the heat generated by dGO per second.

These results can be employed to demonstrate the mechanism involved in the rapid fabrication of holey graphene via MACE. The selective heating of GO sheets by microwave irradiation is an advantage of the MACE method over conventional methods. As depicted in FIG. 13C (left), conventional heating depends on heat conduction and convection within the solution. The heating of a GO sheet is achieved by heat conduction of its surrounding molecules. The hydrogen peroxide molecules can be decomposed before they can react with GO. In contrast, as depicted in FIG. 13C (right), during the MACE, the GO sheets directly interact with microwave irradiation and quickly become the hot spots dispersed in the solution due to in situ heat generation, providing constant energy to facilitate the etching reaction with the surrounding hydrogen peroxide molecules. This implies both the process efficiency and controllability could be modulated by the microwave irradiation during the MACE process.

Capacitive Performance.

The capacitive performance of the holey graphene fabricated via MACE were measured in the 1 M $Na_2SO_4$ aqueous electrolyte with a three-electrode cell. Before electrochemical measurements, the hGO sheets were mildly reduced under microwave irradiation to enhance the electric conductivity by restoring π-π network on the lattice. The mildly reduced hGO was denoted as rhGO. For comparison, the rGO electrode was also prepared by reducing GO sheets under the same condition. The cyclic voltammetry (CV) curves of the rhGO and rGO electrodes were obtained at a scan rate of 50 mV $s^{-1}$ and a potential window from −0.2 to 0.8 V. The specific capacitances of the rhGO electrodes are all higher than that of the rGO electrode (Table 3). The highest specific capacitance of rhGO is 111 F $g^{-1}$, about 3.5 times greater than that of rGO (32 F $g^{-1}$). The capacitance of rGO here is relatively low, due at least in part to the mild reduction level of GO prepared without any additional agent. Nevertheless, this reduction level is enough to exhibit the significant improvement in capacitive performance brought by the nanoholes. Both the double-layer capacitance and pseudo-capacitance are believed to contribute to the capacitive behavior of rhGO and rGO. Compared with rGO, rhGO can provide a larger accessible surface area for double-layer absorption and more electrochemically active sites to promote the pseudo-capacitance. Among the rhGO electrodes fabricated with different duration of pretreatment or MACE, rhGO-PM/EM with a high population and moderate area percentage of nanoholes shows the highest specific capacitance. Although both rhGO-PL and -EL have the population of nanoholes over 1000 $\mu m^{-2}$, their specific capacitances are lower than that of rhGO-PM/EM. The total area percentage of nanoholes on rhGO-PL or -EL is too high to provide a large surface area for double-layer capacitance.

TABLE 3

Electrochemical properties of reduced holey graphene oxide (rhGO).

| Sample | Measurement in sodium sulfate | | | | Measurement in potassium ferricyanide | | | |
|---|---|---|---|---|---|---|---|---|
| | $C_{S,CV}^{a)}$ [F $g^{-1}$] | $C_{S,GCD}^{b)}$ [F $g^{-1}$] | $R_{CT}$ [Ω] | $D_W$ [×$10^{-9}$ $cm^2$ $s^{-1}$] | $\Delta E_P$ [mV] | $R_{CT}$ [Ω] | $D_{R-S}$ [×$10^{-6}$ $cm^2$ $s^{-1}$] | $D_W$ [×$10^{-8}$ $cm^2$ $s^{-1}$] |
| rGO | 32 | 25 | 18 | 0.17 | 91 | 125 | 2.12 × $10^{-3}$ | 4.20 × $10^{-4}$ |
| rhGO-PS | 48 | 46 | 17 | 1.84 | 83 | 107 | 7.03 | 8.14 |
| rhGO-PM | 111 | 112 | 17 | 3.83 | 72 | 98 | 9.52 | 8.25 |
| rhGO-PL | 91 | 84 | 17 | 2.52 | 74 | 96 | 9.94 | 8.35 |
| rhGO-ES | 44 | 42 | 17 | 1.05 | 73 | 104 | 7.92 | 7.57 |
| rhGO-EM | 111 | 112 | 17 | 3.83 | 72 | 98 | 9.52 | 8.20 |
| rhGO-EL | 77 | 72 | 16 | 2.62 | 75 | 99 | 9.49 | 9.55 |

$^{a)}C_{S,CV}$ is the specific capacitance calculated from the CV curves measured at 50 mV $s^{-1}$;
$^{b)}C_{S,GCD}$ is the specific capacitance calculated from the GCD curves measured at 10 A $g^{-1}$.

The galvanostatic charge/discharge (GCD) curves of the rhGO and rGO electrodes scanned at a current density of 10 A $g^{-1}$ and a potential window from 0.2 to 0.8 V. All curves are close to the triangular shape, and their slopes in the low-voltage range become lower due to the enhancement of pseudo-capacitance. The specific capacitances (Table 3) calculated from the GCD curves agree well with the CV results. At a current density of 0.5 A $g^{-1}$, the specific capacitance of rhGO-PM/EM is 137 F $g^{-1}$, 4 times of that of rGO (33.8 F $g^{-1}$). When the current density increases to as high as 100 A $g^{-1}$, the rhGO-PM/EM electrode still retains a larger percentage (69%) of the highest specific capacitance relative to rGO (54%), suggesting a better rate capability of rhGO. This can result from the faster transport kinetics of electrolyte ions to the surface of the rhGO sheets.

The electrochemical impedance spectroscopy (EIS) measurements were employed to analyze the kinetic process of ion diffusion and charge transfer at the electrode-electrolyte interface. The radius of the semicircle in the high-frequency range is proportional to the heterogeneous-charge-transfer resistance (RCT) at the electrode/electrolyte interface, and the slope of the curve in the low-frequency range increase reversely with the Warburg resistance (W) reflecting the ion diffusion process. The curves were fitted using the modified Randles circuit that includes a resistor for the equivalent series resistance (RS) composed of the solution resistance, contact resistance, and intrinsic resistance of the electrode, a constant phase element due to the limit capacitance (CPEL), a CPE due to the double-layer capacitance (CPEDL), a resistor for RCT, and a Warburg impedance element (W). The RS values in the rhGO and rGO electrodes are within a small range of 2.3-2.4Ω, because the solution and contact resistances and the reduction level of all samples are the same. The rhGO and rGO electrodes also have similar RCT values of 16-18Ω (Table 3), while the rhGO electrodes display higher slopes in the low-frequency range, indicating a faster diffusion-controlled process. To quantify the ion diffusion kinetics in the rhGO and rGO electrodes, the ion diffusion coefficient can be obtained by Equation (2):

$$D_W = [RT/(n^2 F^2 A c \sigma_W)]^2/2 \quad (2)$$

where $D_W$ is the ion diffusion coefficient ($cm^2\ s^{-1}$) calculated using the Warburg coefficient σW ($\Omega\ s^{-1/2}$), R is the gas constant ($J\ K^{-1}\ mol^{-1}$), T is temperature (K), n is the number of electron transfer (here is 1), F is the Faraday constant ($C\ mol^{-1}$), A is the geometric surface area of the electrode ($cm^2$), and c is the concentration of $Na^+$ ions ($mol\ ml^{-1}$). $\sigma_W$ can be further obtained from Equation (3):

$$Z' = (R_S + R_{CT}) + \sigma_W \omega^{-1/2} \quad (3)$$

where Z' is the real part of the impedance (Ω) and ω is the frequency ($s^{-1}$). By plotting Z' versus $\omega^{-1/2}$ (i.e., the Warburg plot), $\sigma_W$ can be calculated from the slope of the curve in the low-frequency range. Per Equations (2) and (3), a lower slope in the Warburg plot results in a smaller $\sigma_W$ and higher $D_W$. rhGO electrodes have lower slopes relative to the rGO counterpart. The calculation results (Table 3) show that all the DW values of rhGO are an order of magnitude higher than that of rGO. Among them, rhGO-PM/EM exhibits the highest value of $3.83 \times 10^{-9}\ cm^2\ s^{-1}$, about 20 times larger than that of rGO ($0.17 \times 10^{-9}\ cm^2\ s^{-1}$). This demonstrates that the nanoholes facilitate the ion diffusion kinetics by providing abundant ion transport shortcuts through the rhGO sheets. Among the rhGO electrodes with different duration of pretreatment and MACE, the trend of $D_W$ agrees well with that of specific capacitance calculated from both the CV and GCD curves. The large population and moderate area percentage of nanoholes on rhGO are favorable to improve the accessible surface area and ion diffusion kinetics.

Electrochemical Catalytic Activity.

CV and EIS of the rhGO electrodes measured in the 5 mM $K_3[Fe(CN)_6]$ and 0.1 M KCl aqueous electrolyte can be used to evaluate the electrochemical catalytic activity of rhGO in redox reactions. The redox peaks near 0.2 V are observed in all the CV curves of rhGO and rGO. During a negative scan, $[Fe(CN)_6]^{3-}$ ions are reduced to $[Fe(CN)_6]^{4-}$ ions by capturing electrons from the electrode, causing a cathodic current peak; during a positive scan, $[Fe(CN)_6]^{4-}$ ions are oxidized to $[Fe(CN)_6]^{3-}$ ions, generating an anodic current peak. The rhGO electrodes exhibit higher catalytic activity compared to the rGO counterpart, as indicated by the 40 times higher redox peaks in the CV curves at a scan rate of 10 mV $s^{-1}$. Among the rhGO electrodes, the redox peak grows with the area percentage of nanoholes on rhGO. Higher redox peaks result from both faster redox kinetics and diffusion kinetics. First, more electrochemically active sites around the nanoholes contribute to faster redox kinetics by providing a larger electronic density of states of the electrode material. It can be confirmed by the variation of peak-to-peak separation (ΔEP) in the CV curves of different rhGO electrodes (Table 3). The rhGO electrodes with a higher area percentage of nanoholes tend to have smaller ΔEP, meaning that a lower driving potential is required to trigger the redox reactions. Thus, the high area percentage of nanoholes are beneficial to the faster heterogeneous electron transfer. Second, the nanoholes on rhGO provide abundant shortcuts for ion transportation, leading to faster diffusion kinetics. When ions participate in redox reactions, a diffusion layer gradually forms, where redox reactants are depleted, and further redox reactions are controlled by the ion diffusion rate. In rhGO, ions transport via nanoholes and thus can deliver charges on the rhGO sheets located deeper from the electrode surface, causing a part of the diffusion layer overlapped by the depth of the rhGO electrode. Therefore, compared to the rGO counterpart, the diffusion layer above the surface of the rhGO electrode should be thinner, which facilitates the ion diffusion. The ion diffusion coefficient can be given by the Randles-Sevcik equation:

$$i_p = 0.4463 n^{3/2} F^{3/2} Ac (v D_{R-S}/RT)^{1/2} \quad (4)$$

where $i_p$ is the peak current (A), n is the number of electron transfer (here is 1), c is the concentration of $[Fe(CN)_6]^{3-}$ ions ($mol\ ml^{-1}$), v is the scan rate (V $s^{-1}$), and $D_{R-S}$ represents the diffusion coefficient ($cm^2\ s^{-1}$) of $[Fe(CN)_6]^{3-}$ ions calculated from the Randles-Sevcik equation. By plotting $i_p$ versus $v^{1/2}$ (i.e., the Randles-Sevcik plot), the ion diffusion coefficient can be calculated from Equation (4) using the slope of the curve. Good linear correlations between $i_p$ and $v^{1/2}$ are observed in all samples. The calculation results (Table 3) based on Equation (4) show that the ion diffusion coefficients in rhGO are at least three orders of magnitude higher than that in rGO ($2.12 \times 10^{-9}\ cm^2\ s^{-1}$). The rhGO-PL electrode has the highest ion diffusion coefficients of $9.94 \times 10^{-6}\ cm^2\ s^{-1}$. The ion diffusion rate increases with the area percentage of nanoholes on rhGO, except for rhGO-EL that shows a slight drop compared with rhGO-EM.

The EIS Nyquist plot further demonstrates the distinct redox kinetics and diffusion kinetics between rhGO and rGO, as indicated by different behaviors in both high- and low-frequency ranges. As shown in Table 3, the values of RCT in rhGO are all at least 20Ω smaller than that in rGO, confirming the faster heterogeneous electron transfer on rhGO relative to rGO. Among the rhGO electrodes, the heterogeneous electron transfer becomes faster with increasing area percentage of nanoholes, and the only exception is rhGO-EL that shows a slight drop. This is consistent with the trend of $D_{R-S}$. In addition, the diffusion kinetics can be quantified with the EIS data using the Warburg plot. rhGO-PL shows a much lower slope in the Warburg plot compared to rGO, suggesting a smaller Warburg coefficient. The calculation results (Table 3) of ion diffusion coefficients based on Equations (2) and (3) agree well with those obtained based on Equation (4). These results confirm again that the high area percentage of nanoholes can improve the catalytic activity by providing more electrochemically active sites.

A number of embodiments have been described. Nevertheless, it will be understood that various modifications may be made without departing from the spirit and scope of the disclosure. Accordingly, other embodiments are within the scope of the following claims.

What is claimed is:

1. A method of synthesizing holey graphene oxide, the method comprising:

dispersing graphene oxide in an aqueous solution to yield a first graphene oxide dispersion;

irradiating the first graphene oxide dispersion with microwave radiation, thereby at least partially reducing the graphene oxide in the first graphene oxide dispersion to yield a second graphene oxide dispersion comprising at least partially reduced graphene oxide;

combining the second graphene oxide dispersion with an etching agent to form a third graphene oxide dispersion; and irradiating the third graphene oxide dispersion with microwave radiation to yield a fourth graphene oxide dispersion comprising holey graphene oxide.

2. The method of claim 1, wherein the graphene oxide comprises graphene oxide nanosheets.

3. The method of claim 1, wherein a power of the microwave radiation is in a range between 50 W and 400 W.

4. The method of claim 1, further comprising stirring the first graphene oxide dispersion while irradiating the first graphene oxide dispersion.

5. The method of claim 1, wherein irradiating the first graphene oxide dispersion comprises irradiating the first graphene oxide dispersion for a length of time between 90 seconds and 360 seconds.

6. The method of claim 1, wherein partially reducing the graphene oxide comprises removing functional groups from the graphene oxide.

7. The method of claim 1, wherein the etching agent comprises one or more of hydrogen peroxide, $HNO_3$, KOH, Co, and $O_2$.

8. The method of claim 1, wherein irradiating the third graphene oxide dispersion occurs in a sealed vessel.

9. The method of claim 1, wherein irradiating the third graphene oxide dispersion comprises irradiating the first graphene oxide dispersion for a length of time between 45 seconds and 180 seconds.

10. The method of claim 1, further comprising stirring the third graphene oxide dispersion while irradiating the third graphene oxide dispersion.

11. The method of claim 1, wherein the fourth graphene oxide dispersion comprises a plurality of holey graphene oxide nanosheets.

12. The method of claim 10, wherein each holey graphene oxide nanosheet defines a plurality of openings through a plane of the holey graphene oxide nanosheet.

13. The method of claim 12, wherein each opening in the plurality of openings has a diameter in a range of 1 nm to 100 nm.

14. The method of claim 12, wherein openings of the plurality of openings are uniformly distributed on each holey graphene nanosheet.

15. The method of claim 12, wherein the plane is the basal plane of the nanosheet.

16. The method of claim 1, further comprising reducing the holey graphene oxide to yield reduced holey graphene oxide.

17. The method of claim 1, wherein the C/O ratio of the holey graphene oxide is equal to or greater than the C/O ratio of the graphene oxide in the first graphene oxide dispersion.

18. The method of claim 1, wherein synthesizing the holey graphene oxide occurs in less than one hour.

19. The method of claim 1, wherein irradiating the first graphene oxide dispersion results in the formation of vacancy defects on the graphene oxide by electromagnetic wave-induced heating.

20. The method of claim 1, wherein irradiating the first graphene oxide dispersion results in nonlinear heating of the first graphene oxide dispersion.

* * * * *